United States Patent [19]

Hartog

[11] Patent Number: 5,592,282
[45] Date of Patent: Jan. 7, 1997

[54] SUPPRESSION OF STIMULATED SCATTERING IN OPTICAL TIME DOMAIN REFLECTOMETRY

[75] Inventor: Arthur H. Hartog, Southampton, United Kingdom

[73] Assignee: York Limited, Hampshire, United Kingdom

[21] Appl. No.: 278,173

[22] Filed: Jul. 21, 1994

[30] Foreign Application Priority Data

Jul. 22, 1993 [GB] United Kingdom .................. 9315231

[51] Int. Cl.⁶ .............................. G01N 21/65; G01J 5/06
[52] U.S. Cl. .................... 356/44; 250/227.18; 356/73.1; 356/301
[58] Field of Search ......................... 250/227.18, 227.23, 250/356; 356/43, 44, 73.1, 301; 385/12

[56] References Cited

U.S. PATENT DOCUMENTS

| | | | |
|---|---|---|---|
| 4,859,065 | 8/1989 | Bibby | 356/44 X |
| 5,217,306 | 6/1993 | Wada | 356/44 X |

FOREIGN PATENT DOCUMENTS

| | | |
|---|---|---|
| 0213872 | 3/1987 | European Pat. Off. . |
| 0502283 | 9/1992 | European Pat. Off. . |
| 7115042 | 7/1982 | Japan . |
| 7122404 | 7/1982 | Japan . |
| 2201129 | 8/1990 | Japan . |
| 2140554 | 11/1984 | United Kingdom . |
| 2181830 | 4/1987 | United Kingdom . |
| 2183821 | 6/1987 | United Kingdom . |

OTHER PUBLICATIONS

Conference on Lasers and Electro–Optics, 1990 Technical Digest Series, vol. 7 (Summary of article "Long Distance Distributed Temperature Sensor" pp. 460, 461 by Wada et al.).

*Primary Examiner*—Vincent P. McGraw
*Attorney, Agent, or Firm*—Emrich & Dithmar

[57] ABSTRACT

Optical time domain reflectometry methods and apparatus are proposed in which the back-scattered optical radiation used to produce output signals is restricted to that resulting from Rayleigh scattering of light launched into a fiber 2 at a first wavelength and that in an anti-Stokes spectral band resulting from Raman or Brillouin scattering of optical radiation at the first wavelength. A first set of output signals produced in dependence upon the anti-Stokes back-scatter may be normalized to the geometric mean of a second set of output signals, produced in dependence upon the Rayleigh back-scatter at the first wavelength, and a third set of output signals, produced in dependence upon Rayleigh back-scatter resulting from light launched into the fiber at the anti-Stokes wavelength. Growth in the intensity of optical radiation in a first Stokes (Raman or Brillouin) spectral band may be inhibited, so as to suppress stimulated scattering, for example by making the fiber 2 high loss at the Stokes wavelength and/or launching into the fiber 2, simultaneously with the pulse at the first wavelength, an additional pulse at a third wavelength equal to that of a Stokes spectral line resulting from inelastic scattering of optical radiation at the first Stokes wavelength. The first wavelength may be chosen so as to minimize the transmission loss, in view of the average losses at the first and detected wavelengths or the increase with wavelength of the launch power which can be used before stimulated scattering has a specified effect.

28 Claims, 17 Drawing Sheets

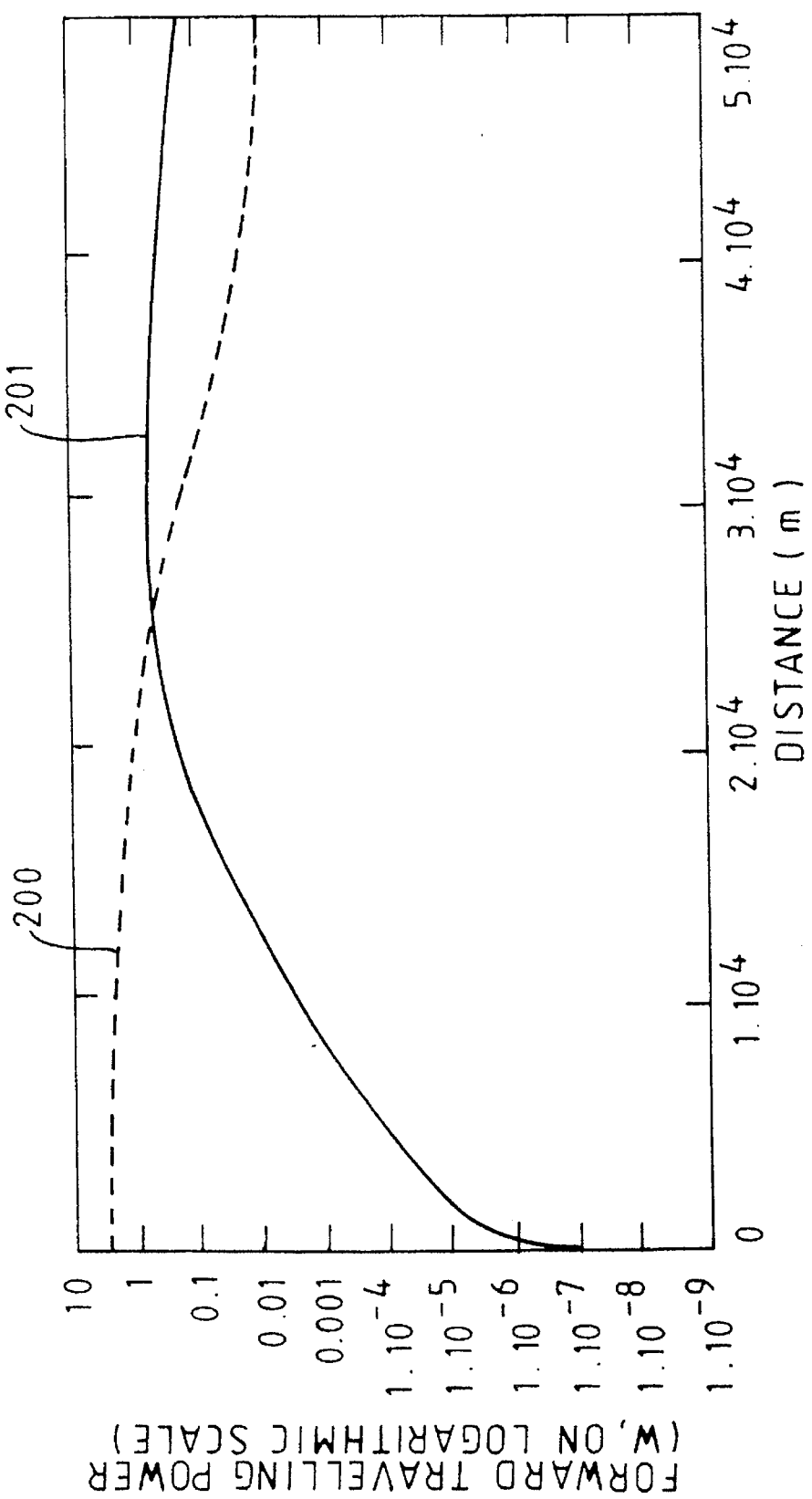

SUPPRESSION OF STIMULATED SCATTERING IN OPTICAL TIME DOMAIN REFLECTOMETRY

BACKGROUND OF THE INVENTION

1. Field of the Invention

The present invention relates to optical time domain reflectometry (OTDR) methods and apparatus for carrying out such methods.

2. Description of the Prior Art

In OTDR light at a first wavelength ($\lambda_0$) is launched into one end of an optical fibre and optical radiation back-scattered along the fibre is measured. In distributed sensing using OTDR the back-scattered radiation is used to measure respective values of a physical parameter at different locations along the fibre, which is deployed in a region of interest. In optical time domain reflectometers, which are used for characterising fibres in their production environments or in installed cables, the back-scattered optical radiation is used, for example, to locate faults in the fibre or to measure the attenuation characteristics of the fibre.

The back-scattered signals may result from either elastic or inelastic scattering processes. Rayleigh scattering produces elastically scattered signals with a wavelength distribution substantially the same as the injected signal ($\lambda_0$). Brillouin and Raman scattering on the other hand are inelastic scattering processes which each produce pairs of spectral bands. Each pair of first order bands comprises one (the Stokes band) centred on a longer wavelength ($\lambda_{+1}$) than that of the injected signal ($\lambda_0$) and the other (the anti-Stokes band) centred on a shorter wavelength ($\lambda_{-1}$) than that of the injected signal, such that the pair is centred on the injected signal wavelength. The spectrum would normally contain several successive orders (at wavelengths $\lambda_{\pm n}$, where n=1, 2, 3 . . . ) resulting from a particular scattering process, the intensity of the bands decreasing as the order increases. In some silica-based materials the Raman spectrum contains more than one band of significant intensity, for example, in a binary $P_2O_5 \cdot SiO_2$ glass, $P_2O_5$ has a band around 1390 cm$^{-1}$ in addition to the main silica band at around 440 cm$^{-1}$.

For an injected signal of 904 nm in silica, Brillouin anti-Strokes and Brillouin Strokes back-scattered signals are shifted by about 0.05 nm from the injected signal, and the first order Raman Stokes and Raman anti-Stokes back-scattered signals are shifted by about 34 nm. The wavelength shifts for the Brillouin and Raman scattered signals are respectively about 0.058 nm and 50 nm for a 1.06 µm signal, and about 0.084 nm and 100 nm for a 1.53 µm injected signal in silica.

The Brillouin and Raman back-scattered signals have intensities dependent on physical parameters, such as temperature. Typically for silica fibres at room temperature, the Raman Stokes and anti-Stokes signals are less intense than those of the Brillouin back-scattered signals, the Raman signals having first order intensities which are lower than the Rayleigh backscatter signal at 1.064 µm by about 18 dB and 28 dB respectively, compared to the Brillouin signals which are about 13 to 16 dB lower than the Rayleigh backscatter signal. With 7 ns, 50W pulses at 1.06 µm in an industry-standard multi µmode fibre (50 µm diameter core, 125 µm cladding, graded-index core and a numerical aperture of 0.20), the power of Raman anti-Stokes wavelength light resulting from back-scattering near the receiving/injecting end of the fibre is about 50 nW.

In a known OTDR method of distributed sensing, such as that described in U.S. Pat. No. 4,823,166, a 1.5W modulated optical signal of wavelength 854 nm at 4 kHz and having a pulse width of 40 ns is injected into one end of an optical fibre of more than 1 km in length. A back-scattered signal is returned to the first end and comprises the aforementioned elastically and inelastically back-scattered signals which are then filtered to remove substantially all but the Raman anti-Stokes signal which passes to detecting means for measurement of its intensity, referenced to the total back-scatter signal. From the change in intensity with the elapsed time from the injected signal, the distribution of a particular physical parameter such as the temperature along the fibre may be deduced.

In an earlier known OTDR method, such as that described in GB-2140554, pulsed light is launched into one end of an optical fibre and back-scattered Raman Strokes and anti-Stokes signals are separated and measured. Ratios of the measurements are then obtained from which a temperature distribution for the fibre is derived.

In a further known OTDR method such as that described in U.S. Pat. No. 5,217,306, optical signals of wavelength 1.32 µm from a source comprising a diode-pumped solid state laser are sent through a length of optical fibre with enhanced Raman scattering properties, an attenuator and an optical filter to emit therefrom a test signal of wavelength 1.40 µm for injection into a sensing optical fibre for measuring temperature therealong. The conversion of the wavelength between 1.32 µm and 1.40 µm is achieved by Stimulated Raman Scattering (SRS) of the first wavelength to produce the second, longer wavelength. Raman anti-Stokes and Raman Stokes signals of respective wavelengths 1.32 µm and 1.50 µm which are subsequently back-scattered from positions along the sensing optical fibre are then detected and processed in the same way as the first mentioned OTDR method.

The range of test signals in optical fibres is limited by dispersion and attenuation. For a given fibre, therefore, the test signal is desirably selected to be at a wavelength corresponding to a minimum in the attenuation/dispersion characteristics of the fibre. For a fibre material such as $GeO_2$ doped silica, a dispersion minimum for the material itself occurs at a wavelength of 1.3 µm, and an attenuation coefficient minimum of about 0.2 dB/km at a wavelength $\lambda$=1.55 µm.

An OTDR distributed sensing system suitable for long range sensing, which uses injected wavelengths in the range 1.51 µm to 1.59 µm, is described in the applicant's British patent application no. 9307660.2 filed on Apr. 14, 1993, the disclosure of which is hereby incorporated by reference.

Long-range sensing requires high power sources. However, at high power, non-linear optical effects appear. A particular problem is stimulated Raman scattering which converts the wavelength launched into the fibre to the first order Stokes wavelength, mainly in the forward direction. As shown in FIGS. 1(A) and 1(B) of the accompanying drawings, which are graphs illustrating the variation in the intensity of optical radiation in an industry-standard single mode fibre (index difference 0.35%, cut-off wavelength 1200 nm) at a test wavelength $\lambda_0$ (dashed line 200) of 1530 nm and the first Stokes Raman wavelength $\lambda_{+1}$ (solid line 201) with distance along the fibre for launch powers of 1W and 3W respectively, the stimulated emission grows along the fibre, which for long-range sensing could be many kilometers in length, until eventually substantially all the light launched into the fibre is converted to the Stokes wavelength. The values given in FIGS. 1(A) and 1(B) are for a typical fibre and are dependent on the design of fibre and test wavelength used. The rate of growth is proportional to the intensity (power/area) of the light launched into the fibre and to parameters of the glass, and is therefore inversely proportional to the area over which the power is confined.

Owing to stimulated Raman scattering, in distributed sensors operating at sufficiently high power levels (e.g. for long-range applications), the signal at the Stokes wavelength becomes significantly greater than it would be without non-linear effects and this distorts the measurements where the Stokes signal is used as a reference. In addition, because power is lost from the light launched into the fibre through conversion to the Stokes wavelength, the signal at the anti-Stokes wavelength is correspondingly weakened. Furthermore, because of the significant build-up of the Stokes power in the forward direction, the connectors in the fibre reflect a large amount of this power, which the filters in the receiver transmit. The strong signal reflected from the connectors can therefore distort the preamplifier output over subsequent fibre sections. FIG. 2 of the accompanying drawings, which shows the back-scattered signals (normalised to unity at 0km) at the anti-Stokes (chain line 202) and Stokes (dashed line 203) wavelengths over a distance of 50,000 meters and the ratio of those two signals (solid lane 204) for an injected power of 3W at 1530 nm in a typical single-mode fibre, illustrates how the Stokes signal increases with distance along the fibre, eventually overcoming the normal effects of fibre attenuation, and thus distorts the anti-Stokes/Stokes ratio. FIG. 3 of the accompanying drawings compares the total forward travelling power at the Stokes wavelength (dashed line 205) when Raman gain is taken into account with that which has a purely linear (spontaneous) origin (solid line 206) in a typical single-mode fibre for an injected pulse of 1.0W at 1530 nm.

By way of example, for a non-dispersion-shifted single mode fibre having a core refractive index of 1.45 and a numerical aperture of 0.1, using an injected signal of 1.53 µm at which it has an attenuation of 0.197 dB/km (0.292 dB/km at the anti-Stroke Raman wavelength of 1.43 µm and 0.311 dB/km at the Stokes wavelength of 1.64 µm), a 2% departure from the value for linear operation, for example, in the ratio of the anti-Stokes to Stokes signal gives an error of roughly 3° C. in distributed temperature sensing applications. For such a fibre 50,000 meters in length, using an injected signal of wavelength 1.53 µm, the non-linearity error begins to exceed 2% at a launch power between 0.9W and 1.0W, the 2% error being exceeded at a distance of 39,650 m at a power of 1W and at 12,050 m at a power of 2W. Although these values are very sensitive to a number of factors, including very small changes in fibre loss, they serve to illustrate the effect of stimulated Raman scattering on measurements taken using distributed sensing.

The early onset of stimulated Raman scattering can also be a problem in optical time domain reflectometers in which it is especially important to ensure that the optical fibre is operated in the linear regime, since the referencing used in distributed sensing is not available.

Thus, to avoid the onset of stimulated Raman scattering, heretofore the power of the light launched into the fibre has been restricted, with the result that the range over which measurements can be taken is limited.

Similar problems arise owing to stimulated Brillouin scattering.

BRIEF SUMMARY OF THE INVENTION

According to a first aspect of the present invention, there is provided an optical time domain reflectometry method of sensing respective values of a physical parameter at different locations along an optical fibre, deployed through a region of interest, in which method optical radiation at a first wavelength is launched into the fibre and back-scattered optical radiation in at least one preselected spectral band used to produce output signals dependent upon the values being sensed, wherein none of the spectral bands used to produce said output signals lies about a second wavelength which is equal to the wavelength on which a first order Stokes spectral band, which results from inelastic scattering in the fibre of optical radiation at said first wavelength, is centred, and relative growth in the intensity in the fibre of optical radiation at said second wavelength is inhibited, thereby to suppress conversion in the fibre through stimulated scattering of optical radiation at said first wavelength to optical radiation at said second wavelength.

Since measurements are not made on the basis of optical radiation at the Stokes (second) wavelength, the system can be designed so as to be high loss at that wavelength, thereby reducing the intensity of light at this wavelength in the fibre and delaying the onset of stimulated scattering. In addition, the wavelength range over which the fibre must be low loss is narrower. Furthermore, use of the Rayleigh scattered signal (at the first wavelength) as a reference, rather than the Stokes signal, advantageous in that it is a much stronger signal, allowing reductions in the measurement time required and improvements in measurement accuracy.

Such a method can be carried out using optical time domain reflectometry apparatus for sensing respective values of a physical parameter at different locations through a region of interest which embodies a second aspect of the present invention, which apparatus comprises an optical fibre adapted to be deployed through said region of interest, source means for launching optical radiation at a first wavelength into the fibre, and detection means for receiving optical radiation back-scattered along the fibre from which respective values of the physical parameter can be derived, wherein filtering means are provided for restricting the back-scattered radiation used to derive said values to one or more preselected spectral bands, none of which lies about a second wavelength which is equal to the wavelength on which a first order stokes spectral band, which results from inelastic scattering in the fibre of optical radiation at said first wavelength, is centred, and the said source means and/or the said optical fibre are selected and arranged so as to inhibit growth in the intensity in the fibre of optical radiation at said second wavelength, thereby to suppress conversion in the fibre through stimulated scattering of optical radiation at said first wavelength to optical radiation at said second wavelength.

Preferably, the one of the preselected spectral bands is an anti-Stokes band resulting from Raman or Brillouin scattering in said fibre and/or a spectral band which lies about said first wavelength.

The physical parameter to be measured may be, but is not necessarily, temperature.

Inhibition of the growth in intensity of optical radiation at said second wavelength may be achieved by selecting said first wavelength in accordance with a predetermined attenuation characteristic of the fibre such that said first wavelength and/or the one or more preselected spectral bands lie adjacent to a local attenuation coefficient minimum but said second wavelength is displaced from said local attenuation coefficient minimum, optical radiation at said second wavelength thereby being attenuated to a significantly greater extent than optical radiation at said first wavelength or in the or each spectral band.

This may be carried out by arranging that the said second wavelength coincides with an infra-red absorption maximum in the attenuation characteristic of the fibre or lies substantially on the short-wavelength edge of such an absorption maximum, or with a local absorption maximum in that characteristic corresponding to naturally-occurring impurities in the fibre, such as hydroxide ions, or doped impurities in the fibre, such as rare earth metal ions. In the case of hydroxide ions, the first wavelength could conveniently be 1320 nm from a Nd:YAG source.

Alternatively, or additionally, the optical fibre may be provided with built-in gratings for reflecting optical radiation at said second wavelength, and/or at least a section of the fibre may be bent so as to induce bending loss in the fibre at said second wavelength, and/or the waveguide structure of the fibre may be designed such that loss is high at the second wavelength.

A preferred approach, which may be used instead of or in addition to those described above, is to launch optical radiation at a third wavelength, equal to the wavelength on which a first order Stokes spectral band, which results from inelastic scattering in the fibre of optical radiation at the said second wavelength, is centred, into the fibre simultaneously with said optical radiation at said first wavelength, thereby to cause optical radiation at said second wavelength to be converted to optical radiation at said third wavelength through stimulated scattering, so as to achieve the desired inhibition in growth of optical radiation at said second wavelength.

According to a third aspect of the present invention, there is provided an optical time domain reflectometry method of characterising an optical fibre, in which optical radiation at a preset first wavelength is launched into the fibre and optical radiation back-scattered along the fibre is used to measure a selected characteristic of the fibre, wherein, so as to inhibit growth in the intensity in the fibre of optical radiation at a second wavelength, equal to the wavelength on which a first order Stokes spectral band, which results from inelastic scattering in the fibre of optical radiation at said preset first wavelength, is centred, optical radiation at a third wavelength is launched into the fibre simultaneously with optical radiation at said preset first wavelength, said third wavelength being selected so as to be equal to the wavelength on which a first order Stokes spectral band, which results from inelastic scattering in the fibre of optical radiation at said second wavelength, is centred, thereby causing optical radiation at said second wavelength to be converted to optical radiation at said third wavelength and so suppressing conversion in the fibre of optical radiation at said preset first wavelength to optical radiation at said second wavelength through stimulated scattering.

The use of optical radiation at such a third wavelength is particularly useful where other techniques cannot be used, for example in characterising fibres using an optical time domain reflectometer where it is not possible to employ any technique which requires the use of anything other than a standard fibre, specified test wavelength or preset fibre deployment state.

A method embodying the third aspect of the present invention may be carried out using optical time domain reflectometry apparatus for characterising an optical fibre, which embodies a fourth aspect of the present invention and comprises source means operable to launch optical radiation at a preset first wavelength into the fibre, and detection means operable to detect optical radiation back-scattered along the fibre which is used to measure a selected characteristic of the fibre, wherein, so as to inhibit growth in the intensity in the fibre of optical radiation at a second wavelength, equal to the wavelength on which a first order Stokes spectral band, which results from inelastic scattering in the fibre of optical radiation at said preset first wavelength, is centred, the source means are also operable to launch optical radiation at a third wavelength into the fibre simultaneously with optical radiation at said preset first wavelength, said third wavelength being equal to the wavelength on which a first order Stokes spectral band which results from inelastic scattering in the fibre of optical radiation at said second wavelength is centred, thereby causing optical radiation at said second wavelength to be converted to optical radiation at said third wavelength and so suppressing conversion in the fibre of optical radiation at said preset first wavelength to optical radiation at said second wavelength through stimulated scattering.

In a method embodying either the first or the third aspect of the present invention in which light at a third wavelength is launched into the fibre with light at the first wavelength, to inhibit growth in intensity in the fibre of optical radiation at a fourth wavelength, equal to the wavelength on which a first order Stokes spectral band, which results from the inelastic scattering in the fibre of optical radiation at the said third wavelength, is centred, optical radiation at a fifth wavelength, equal to the wavelength on which a first order Stokes spectral band, which results from inelastic scattering in the fibre of optical radiation at the said fourth wavelength, is centred, may be launched into the fibre simultaneously with the optical radiation at said third wavelength, thereby to cause optical radiation at said fourth wavelength to be converted to optical radiation at said fifth wavelength through stimulated scattering. This technique increases the maximum power at which radiation may be launched into the fibre before the onset of problems resulting from stimulated scattering.

According to a fifth aspect of the present invention there is provided an optical time domain reflectometry method of sensing respective values of a physical parameter at different locations along an optical fibre, deployed through a region of interest, in which method optical radiation at a preselected wavelength is launched into the fibre and back-scattered optical radiation in first and second preselected spectral bands, centred on respective first and second wavelengths, is used to produce output signals dependent upon the values being sensed, wherein said preselected wavelength is selected in accordance with a predetermined attenuation characteristic of said fibre such that an average attenuation value, determined by taking the average of the respective attenuation losses at said first and second wavelengths, is substantially minimised. In this way an increase in sensing range can be obtained.

A method embodying the fifth aspect of the present invention may be carried out using optical time domain reflectometry apparatus for sensing respective values of a physical parameter at different locations through a region of interest which embodies a sixth aspect of the present invention, which apparatus comprises an optical fibre adapted to be deployed through said region of interest, source means for launching optical radiation at a preselected wavelength into the fibre, detection means for receiving optical radiation back-scattered along the fibre from which respective values of the physical parameter can be derived, and filtering means for restricting the back-scattered radiation used to derive said values to first and second preselected spectral bands, centred on respective first and second wavelengths, wherein said preselected wavelength is such that an average attenuation value, determined by taking the average of the respective attenuation losses at said first and second wavelengths, is substantially minimised.

An increase in sensing range can also be obtained using a method embodying a seventh aspect of the present invention, according to which there is provided an optical time domain reflectometry method for sensing respective values of a physical parameter at different locations along an optical fibre, deployed through a region of interest, in which method optical radiation at a first preselected wavelength is launched into the fibre and back-scattered optical radiation in at least one preselected spectral band is used to produce output signals dependent upon the values being sensed, wherein none of the spectral bands used to produce said output signals lies about a second wavelength which is equal to the wavelength on which a first order Stokes spectral band, which results from inelastic scattering in the fibre of optical radiation at said first preselected wavelength, is centred and said first preselected wavelength is selected so as to substantially minimise, for a preset length of said fibre, the value of a power loss variable for the fibre concerned, which variable is determined by subtracting from a first wavelength-dependent function, giving the total power loss along the preset length of fibre of forward- and backward-travelling optical radiation, a second wavelength-dependent function giving the maximum forward-travelling power which can be launched into said fibre such that power loss due to stimulated scattering in the fibre does not exceed a predetermined value, both rune%ions being expressed in logarithmic units.

Such a method may be carried out using optical time domain reflectometry apparatus for sensing respective values of a physical parameter at different locations through a region of interest which embodies an eighth aspect of the present invention, which apparatus comprises an optical fibre adapted to be deployed through said region of interest, source means for launching optical radiation at a preselected wavelength into the fibre, detection means for receiving optical radiation back-scattered along the fibre from which respective values of the physical parameter can be derived, and filtering means for restricting the back-scattered radiation used to derive said values to one or more preselected spectral bands, wherein none of the spectral bands used to produce output signals lies about a second wavelength which is equal to the wavelength on which a first order Stokes spectral band, which results from inelastic scattering in the fibre of optical radiation at said first preselected wavelength, is centred and said preselected wavelength is such that, for a preset length of said fibre, the value of a power loss variable for the fibre concerned is substantially minimised, which variable is determined by subtracting from a first wavelength-dependent function, giving the total power loss along the said preset length of fibre of forward- and backward-travelling optical radiation, a second wavelength-dependent function giving the maximum forward-travelling power which can be launched into said fibre such that power loss due to stimulated scattering in the fibre does not exceed a predetermined value, both functions being expressed in logarithmic units.

According to a ninth aspect of the present invention there is provided an optical time domain reflectometry method of sensing respective values of a physical parameter at different locations along an optical fibre, deployed through a region of interest, in which method optical radiation at a first wavelength is launched into the fibre and back-scattered optical radiation in first and second spectral bands, centred respectively on said first wavelength and a second wavelength equal to the wavelength of an anti-Stokes spectral band which results from inelastic scattering in the fibre of optical radiation at said first wavelength, is used to produce respective first and second sets of output signals, wherein, non-simultaneously with optical radiation at said first wavelength, optical radiation substantially at said second wavelength is launched into the fibre and back-scattered optical radiation in a third spectral band, centred on said second wavelength, is used to produce a third set of output signals, and a final set of output signals, dependent upon the values being sensed, is produced by normalising the first set of output signals to the geometric mean of the second and third sets of output signals.

This technique increases the accuracy with which losses may be calibrated and also substantially removes the effects of changes in the fibre properties along its length.

Such a method may be carried out using optical time domain reflectometry apparatus for sensing respective values of a physical parameter at different locations through a region of interest which embodies a tenth aspect of the present invention, which apparatus comprises an optical fibre adapted to be deployed through said region of interest, source means operable selectively to launch optical radiation at a first wavelength into the fibre, detection means for receiving optical radiation back-scattered along the fibre, and signal processing means for using such back-scattered optical radiation in first and second spectral bands, centred respectively on said first wavelength and a second wavelength equal to the wavelength of an anti-Stokes spectral band which results from an inelastic scattering in the fibre of optical radiation at said first wavelength, to produce respective first and second sets of output signals, wherein said source means are also selectively operable to launch optical radiation substantially at said second wavelength into the fibre, non-simultaneously with optical radiation at said first wavelength, and said signal processing means are operable to use resulting back-scattered optical radiation in a third spectral band, centred on said second wavelength, to produce a third set of output signals, and are further operable to produce a final set of output signals, dependent upon the values being sensed, by normalising the first set of output signals to the geometric mean of the second and third sets of output signals.

BRIEF DESCRIPTION OF THE DRAWINGS

FIGS. 1(A) and 1(B), 2 and 3 (described above) are graphs;

DETAILED DESCRIPTION OF THE PREFERRED EMBODIMENTS

Figure 1A:
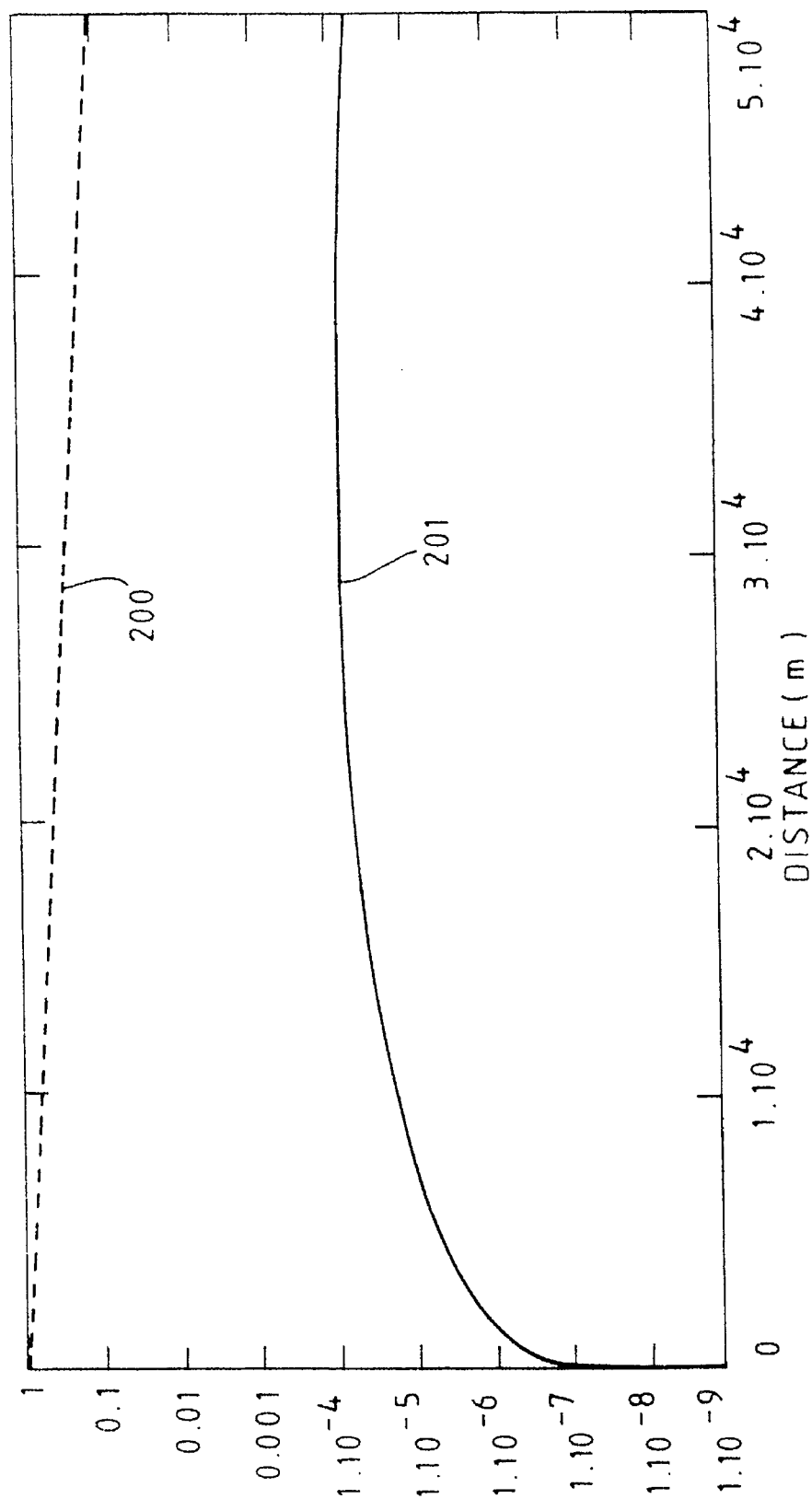
Figure 2:
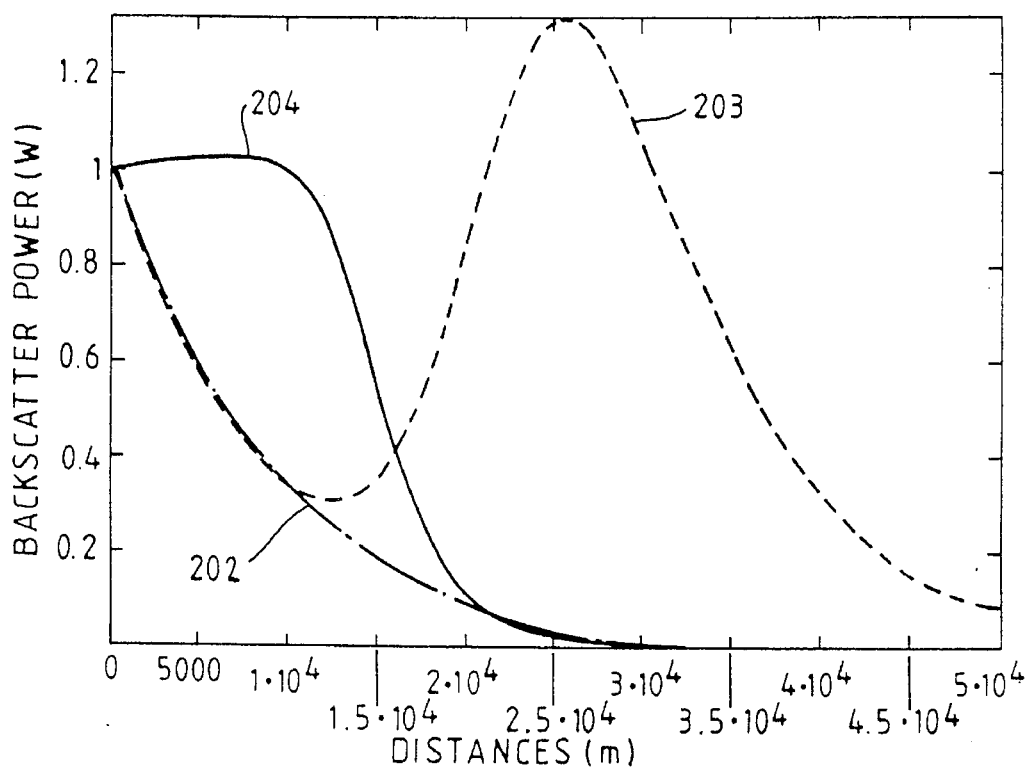
Figure 3:
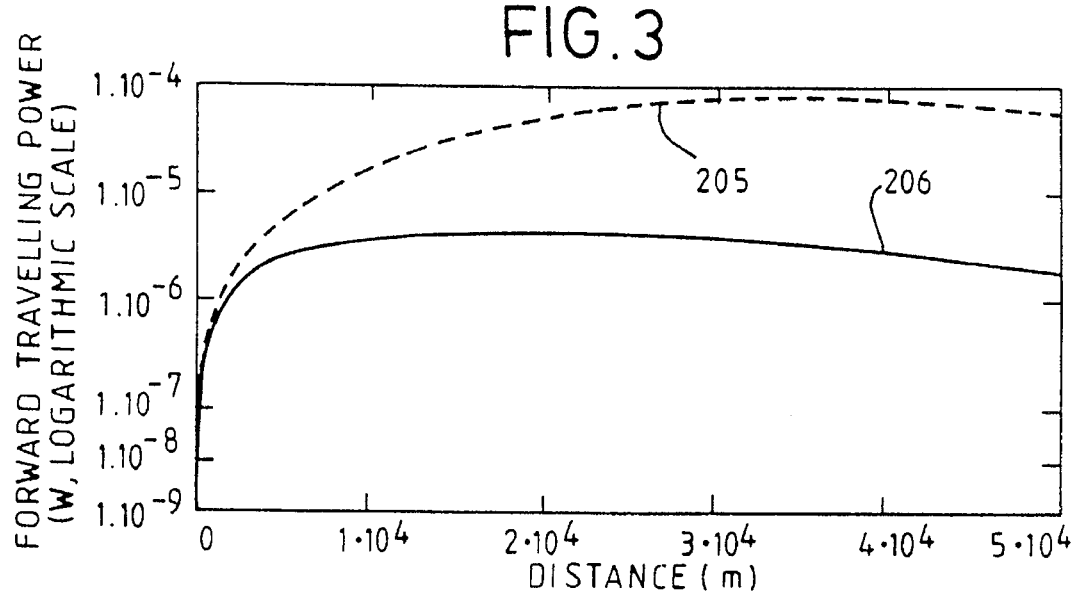
Figure 4A:
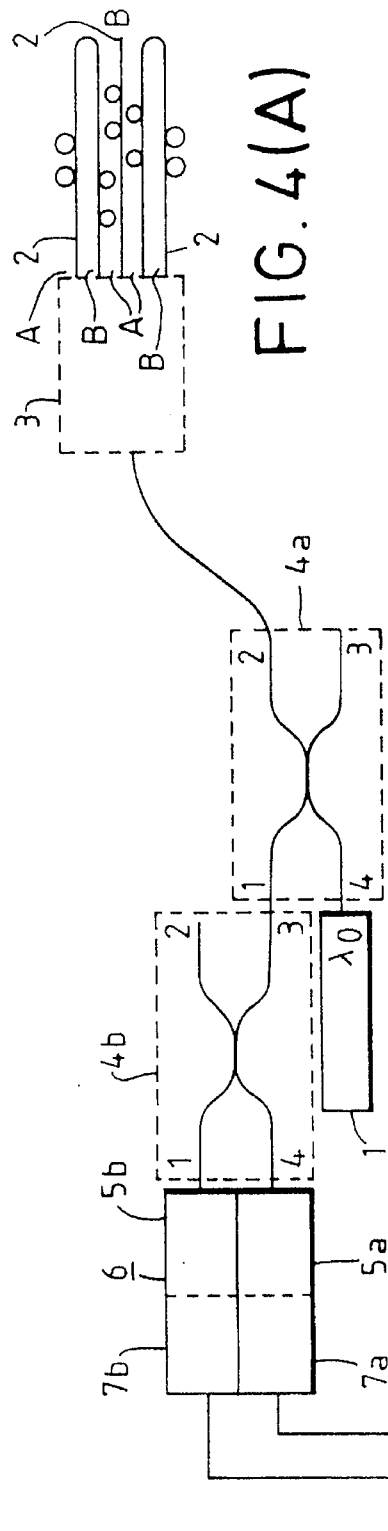
FIG. 4(A) is a schematic diagram illustrating a first embodiment of apparatus according to the second aspect of the present invention.

The apparatus of FIG. 4A is suitable for carrying out the method embodying the first aspect of the present invention and comprises an optical source 1 arranged for launching pulses of optical radiation at a first wavelength $\lambda_0$ into one end A, towards the other end B, of any one of a number of selected sensing fibres 2 deployed in a region of interest, via a first directional coupler 4a and appropriate launching optics 3.

A proportion of the injected radiation is back-scattered along the fibre and is guided back towards the launching end A. Typically, for 80 ns, 1W pulses at a wavelength of 1550 nm injected into a single mode fibre having a numerical aperture 0.11, the back-scattered anti-Stokes wavelength signal has a power of about 600 pW. The back-scattered light is directed, via a second directional coupler 4b, to optical filtering and detecting means 6. In this embodiment optical radiation in two preselected spectral bands, one of which is that at $\lambda_0$ due to Rayleigh scattering and the other, at $\lambda_{-1}$, is the first order anti-Stokes Raman band, are measured. Accordingly, the optical filtering and detecting means 6 conveniently comprise two filters 5a, 5b, and two detectors 7a, 7b, dedicated to respective wavelengths $\lambda_{-1}$, $\lambda_0$. Instead of two separate filters 5a, 5b, a moving filter arrangement may be provided, but the desired filtering may also be achieved using one or more of any device which selectively reflects, absorbs, scatters, deflects, polarises or otherwise passes light in one or more preselected spectral bands, including a small proportion (1–20%) of the Rayleigh back-scatter, but not the remainder of the spectrum. Furthermore, the filtering device(s) may be combined with the couplers 4a, 4b.

Although use of the Rayleigh and anti-Stokes Raman spectral bands is preferred, any suitable spectral bands may be used excluding those at a second wavelength $\lambda_{+1}$ equal to the longer of two wavelengths of optical radiation which result from inelastic scattering (Raman and/or Brillouin) in the fibre of light at wavelength $\lambda_0$. Accordingly, since measurements are not made on the basis of optical radiation at $\lambda_{+1}$, the system can be designed so as to be high loss at $\lambda_{+1}$, thereby reducing the intensity of light at this wavelength in the fibre and delaying the onset of stimulated scattering. In addition, the wavelength range over which the fibre must be low loss is narrower. In this respect, for a $\lambda_0$ of between 1550 to 1650 nm, the separation between each of the wavelengths $\lambda_0$, $\lambda_{-1}$, $\lambda_{+1}$ is of the order of 100 nm. The fibre loss is not uniform over this wavelength range, or over the intensity range of the signals, and the overall system losses are thus higher than if one were operating closer to the centre of the transmission window. Over several tens of kilometers even small differences (for example, 0.1 dB/km) can have a profound effect on system performance.

Use of the Rayleigh scattered signal as a reference, rather than the Stokes signal, is also advantageous in that it is a much stronger signal. Thus, the measurement time required to acquire the reference can be reduced, and the sensitivity of the ratio of anti-Stokes to Rayleigh signals is enhanced. Furthermore, reflections from connectors, also strong in Rayleigh back-scatter, can be dealt with in the preamplifier design, by sacrificing sensitivity (noise performance) for greater dynamic range.

The directional couplers 4a, 4b could be all optical fibre dichroic beam splitters (also known as wavelength division multiplexers) which separate the forward and backward travelling waves and the wavelengths of predetermined values, or devices serving a similar purpose formed of bulk optics, integrated optics, or a mixture of bulk optics and fibre optics.

Figure 4B:
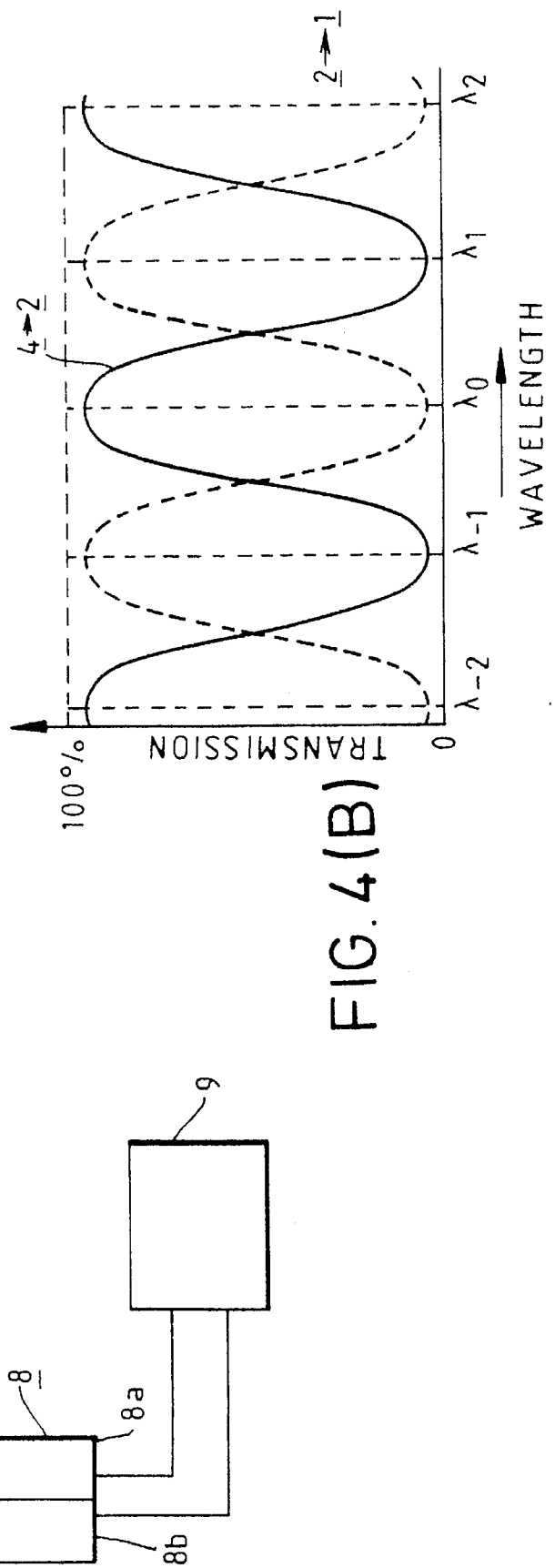
FIG. 4(B) is a graph showing the variation of the transmission coefficient of a coupling device shown in FIG. 4(A) with wavelength.

For use with a single mode fibre 2, as shown in FIG. 4(A), respective fused taper couplers 4a, 4b may conveniently be used. The transmission characteristic of the first directional coupler 4a is shown in FIG. 4(B). The coupling coefficient of this device 4a may be designed to vary sinusoidally with wavelength in the wavelength range of interest, so as to transmit a high fraction of the light entering port 4 to port 2, provided this light is at the test wavelength $\lambda_0$ (or higher, even order wavelengths $\lambda_{\pm 2}$, ... )., a small but finite proportion (1 to 20%) of the return signal at $\lambda_0$ between ports 2 and 1, and a high fraction of the light at wavelength $\lambda_{-1}$ entering port 2 to port 1.

Thus, in practice, $\lambda_0$ should pass from ports 4 to 2 with minimum loss and $\lambda_{-1}$ should pass from ports 2 to 1 with minimum loss. This is possible because the wavelengths are different. Since $\lambda_0$ should also pass from ports 2 to 1, some limitations should be imposed on the transmission at the same wavelength from ports 4 to 2, but in practice, because the Rayleigh scatter is so much more intense than the Raman scatter, the dilemma can be resolved by sacrificing the transmission efficiency for the Rayleigh scattering (i.e. from 2 to 1 at $\lambda_0$).

The transmission characteristic of the second directional coupler 4b is such that a high fraction of the light at $\lambda_{-1}$ entering port 3 is transmitted to port 4 and a high fraction of the light at $\lambda_0$ entering port 3 is transmitted to port 1, but that little light at $\lambda_{-1}$ is transmitted from port 3 to port 1 and little light at $\lambda_{-0}$ is transmitted from port 3 to port 4.

Figure 5A:
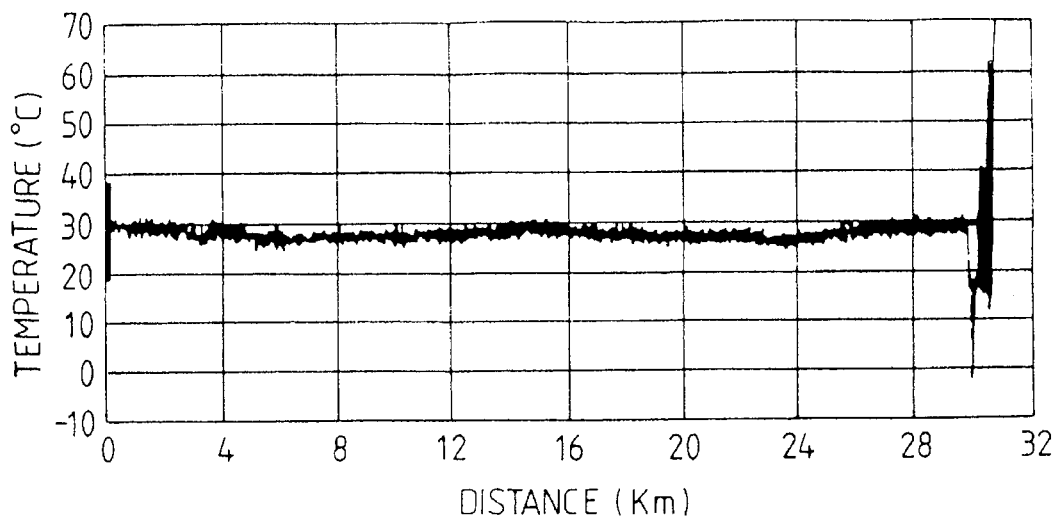
FIG. 5(A) is a graph illustrating a measured temperature distribution along a fibre.
Figure 5B:
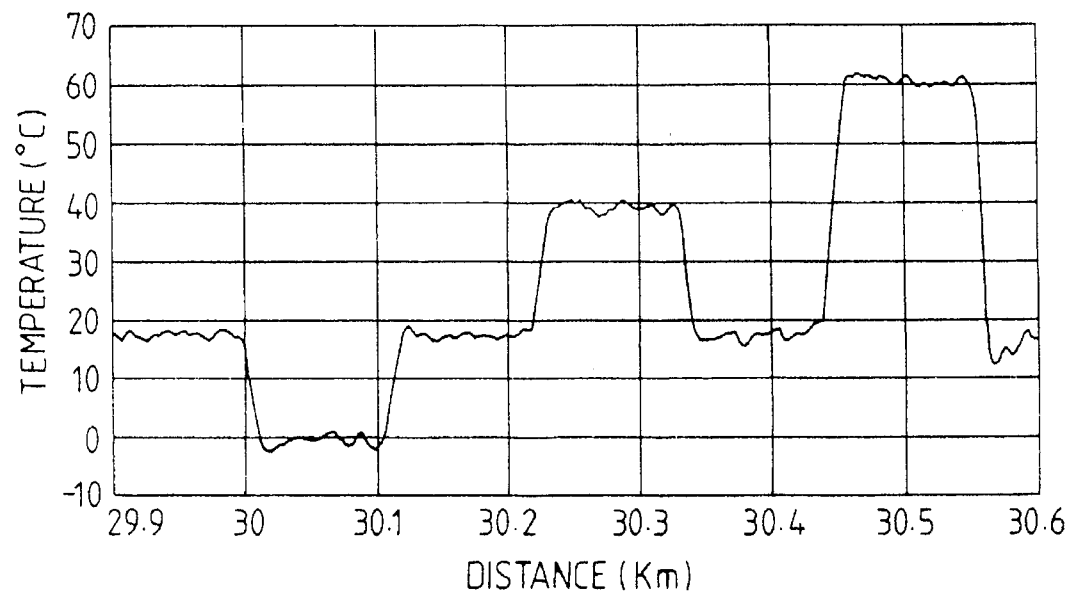
FIG. 5(B) shows a portion of the graph of FIG. (A) to an enlarged scale.

The detectors 7a, 7b are followed by respective low noise preamplifiers 8 (8a and 8b) (and possibly further stages of amplification and electrical filtering, not shown). The electrical signals thus produced are converted into digital signals and processed by a processor 9 which produces therefrom a set of readings, in this embodiment based on a ratio of the anti-Stokes and Rayleigh signals, representative of a distribution along the fibre 2 from one end A to its other end B. FIGS. 5(A) and 5(B) show such a distribution of temperature, when the measurements have been calibrated and adjusted for non-temperature dependent variations in attenuation. This process is preferably repeated and averaged over many returned pulses to calculate to a sufficient accuracy the temperature distribution along the fibre. The processor 9 may also control, for example, the source 1, the selected fibre 2 or the filter 5. Ideally, for each laser pulse, samples from every resolvable point along the fibre are acquired; that is, the whole fibre is measured quasi-simultaneously. This is less time-consuming than the alternative of sampling at a single point in the fibre until an adequate signal-to-noise ratio is achieved and then moving the sampling point along the fibre. The results may be further improved by performing the measurement from each end of the fibre to separate variations in the signal caused by temperature fluctuations from those from fibre loss, and for this reason some of the fibres 2 shown in FIG. 4(A) are looped back on themselves (but obviously this need not be so). By calculating the geometric mean of the back-scattered signals measured from both ends of the fibre returning from a particular location, the effects of any propagation losses can be eliminated, leaving only the effects of changes in the back-scatter of the injected signal, i.e. changes of numerical aperture or the scattering coefficient in the spectral band of interest.

A preferred method of determining and therefore reducing the effects of propagation losses in the fibre on the results, whilst also collecting data relevant to the measured sensed, is to make two sets of measurements, one at the test wavelength $\lambda_0$ in which the spectral bands at $\lambda_0$ and $\lambda_{-1}$ are measured, and the other at wavelength $\lambda_{-1}$ in which the spectral band at $\lambda_{-1}$ is measured.

In particular, the sensing (for example, of temperature) is carried out by launching light at wavelength $\lambda_0$ and detecting the corresponding anti-Stokes radiation at wavelength $\lambda_{-1}$. In order to characterise the fibre at the time of the measurement two further measurements are carried out at the relevant wavelengths, namely $\lambda_0$ and $\lambda_{-1}'$. The wavelength $\lambda_{-1}'$ coincides with the anti-Stokes wavelength of $\lambda_{-1}$, but is denoted $\lambda_{-}'$ to allow for processing corrections to be made if errors occur in the wavelength selection process. In most practical circumstances, however, these errors are negligible. The first of these measurements can be obtained by also measuring the Rayleigh scattering when light at $\lambda_0$ is launched into the fibre for the sensing measurement (either simultaneously or subsequently) and in the second case by launching at $\lambda_{-1}'$ and measuring the Rayleigh scattering.

These two measurements, at $\lambda_0$ and $\lambda_{-1}'$, not only calibrate the losses in situ as accurately as possible, but also remove, to a substantial degree, the effect of changes of fibre properties (e.g. numerical aperture or core diameter) along the fibre. The sensitivity to these effects is reduced by a factor of around 20, primarily because they affect all three measurements in a similar way. For example an increase in the fibre numerical aperture along its length (e.g., resulting from process tolerances) would lead to an increase in the capture efficiency of the scattered light, i.e. to an increase in the back-scatter signal which would be interpreted as an increase in temperature if only the $\lambda_0$ to $\lambda_{-1}$ scattering process were considered. To compute the sensed parameter, a waveform obtained by normalising the $\lambda_0$ to $\lambda_{-1}$ scattering measurement to the geometric mean of the two reference measurements, namely the $\lambda_0$ to $\lambda_0$ and $\lambda_{-1}'$ to $\lambda_{-1}'$ backscatter measurements, may be used. These suffer almost identical distortions from changes in fibre properties, and thus largely eliminate this type of error. For example, if at a point along the fibre the numerical aperture were to vary by 10%, this would without normalization result in a change in back-scatter level of 22%, which in turn would result (in temperature sensing) in an error of about 28° C.; however, using the proposed signal processing method, such an error would be reduced to less than 1° C.

Figure 6:
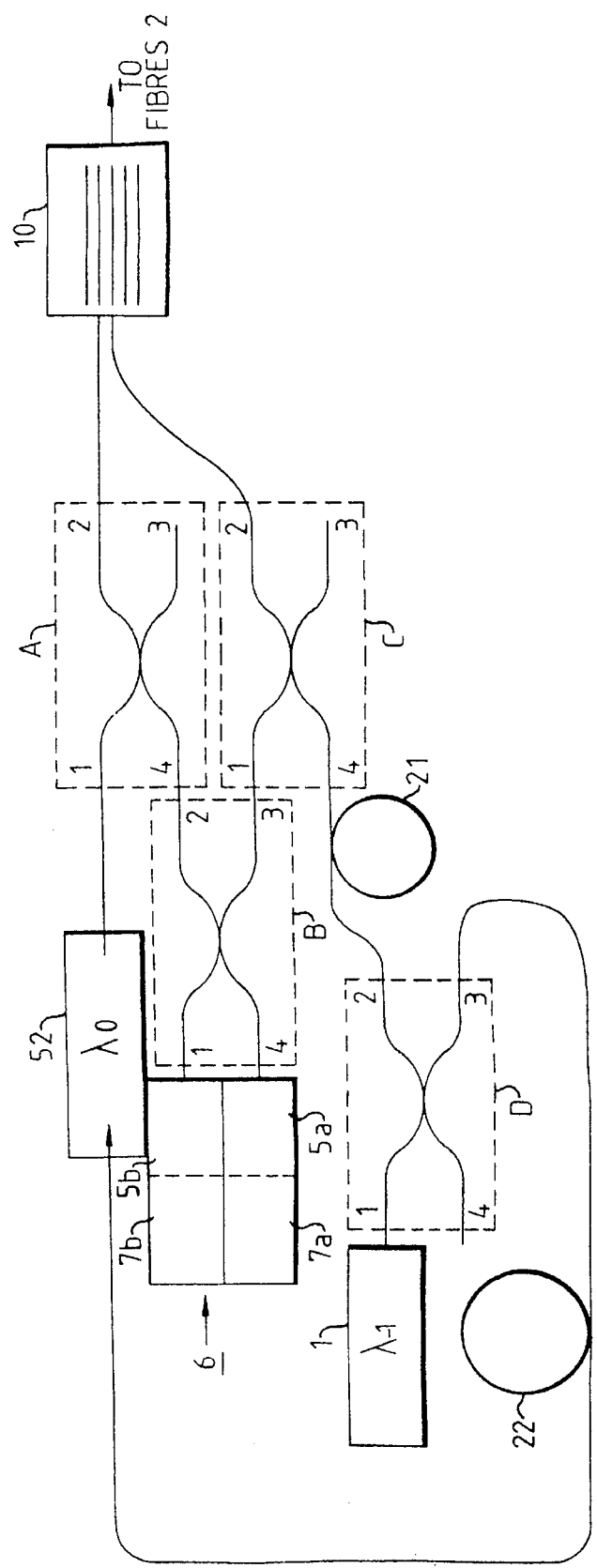
FIG. 6 shows apparatus embodying the tenth aspect of the present invention.

Although two separate sources may be used to provide light at the wavelengths $\lambda_0$, $\lambda_{-1}'$ respectively, it is convenient to use a single laser source at $\lambda_{-1}'$ and to generate $\lambda_0$ by stimulated conversion in a fibre associated with the source, as shown in FIG. 6.

In the arrangement of FIG. 6, light at wavelength $\lambda_{-1}'$ generated by a source 1 is launched into port 1 of a first coupler D operable to transmit a small proportion (approximately 10%) of the light at $\lambda_{-1}'$ to its port 2, to which there is connected one end of a delay line 21, and the remainder of the light (about 90%) to its port 3, which is connected to one end of a length of a fibre 22 having a high Raman gain. The Raman shifting fibre 22 converts most of the light at $\lambda_{-1}'$ to the first Raman Stokes wavelength, i.e. to light at $\lambda_0$, through stimulated Raman scattering, but no significant proportion to the second Raman Stokes wavelength. The other end of the Raman shifting fibre 22 is connected to a band pass filter 52, operable to output light at $\lambda_0$.

It would be possible to launch the entire laser output at $\lambda_{-1}'$ into the Raman shifting fibre 22 and to separate out the $\lambda_{-1}'$ and $\lambda_0$ outputs (both of which are required) afterwards; this is slightly less desirable, however, because the power remaining at $\lambda_{-1}'$ is likely to be far less stable than the original power, which leads to practical difficulties in setting up and operating the instrument.

The length of Raman shifting fibre 22 required can be modest, especially if polarisation-maintaining fibre with a very large refractive index difference is used with a commercially available polarisation-maintaining (high-birefingence) single mode fibre, (e.g. HB1550 from Fibercore Ltd, Chandler's Ford, UK) having a numerical aperture of 0.15, a launched power of about 100W at $\lambda_{-1}'=1530$ nm is sufficient to obtain efficient conversion to the first Stokes wavelength, $\lambda_0=1640$ nm, in a fibre length of around 130 m. Using a standard single mode fibre, which is usually far cheaper, typically 50W pulses would be required to obtain a high conversion efficiency in 800 m of fibre, or 100W in 400 m of fibre.

For reasons which will be described later, for a range of around 30 km the optimum value of the wavelength $\lambda_0$ is around 1640–1650 nm. This coincides with the first Raman Stokes wavelength of an Erbium-doped fibre laser (Erbium-doped fibres have peak gains around 1530–1540 nm), so a Q-switched Erbium-doped fibre laser operating at 1537 nm, giving a $\lambda_0$ of 1648 nm, would be a particularly convenient choice of source for this range.

Figure 7:
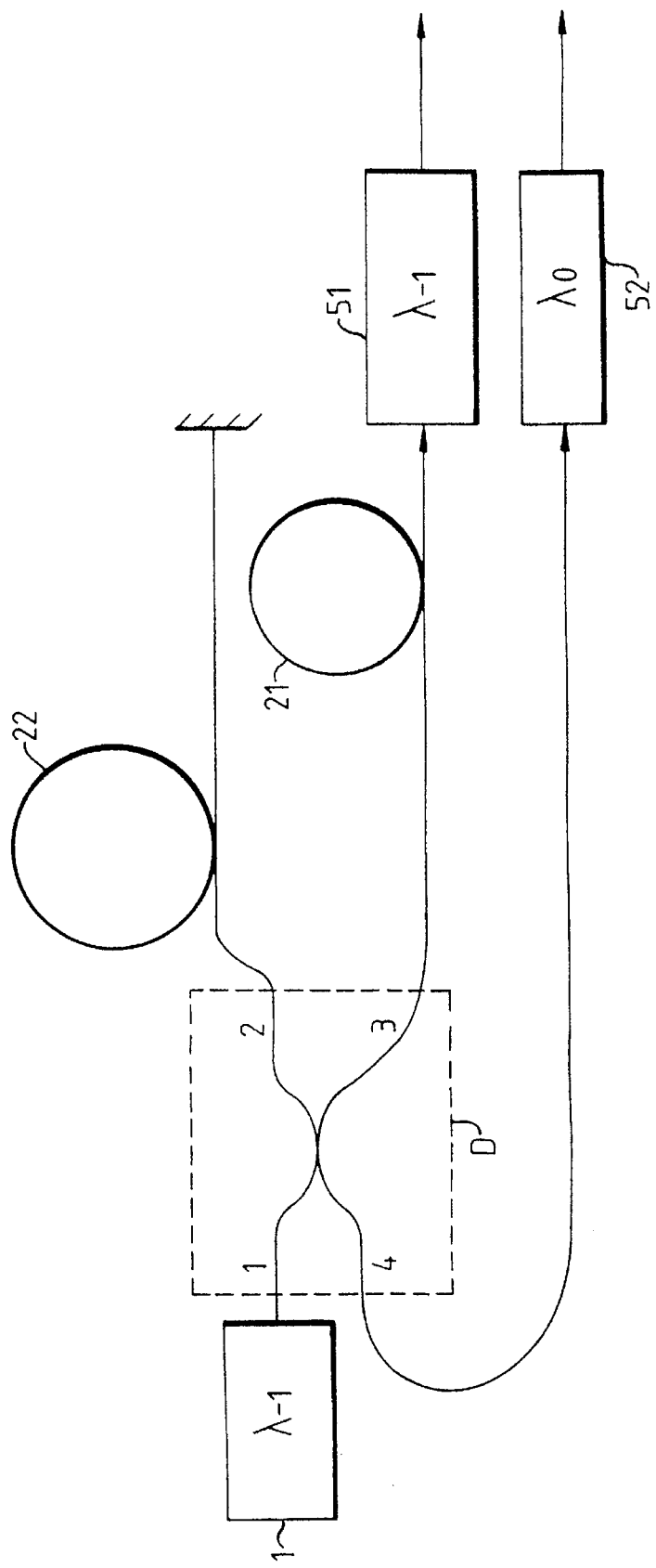
FIG. 7 shows apparatus for use with that of FIG. 6.

A preferred way of generating $\lambda_0$ from $\lambda_{-1}'$ is shown in FIG. 7. As in FIG. 6, light at $\lambda_{-1}'$ is split by the first coupler D into two components, small proportion (about 10%) of the light passing from port 1 to port 3, which is connected to an optional delay line 21 and an optional bandpass filter 51 operable to output light at $\lambda_{-1}'$, and the remainder (about 90%) being transmitted from port 1 to port 2. Port 2 is connected to one end of a length of wavelength shifting fibre 22, the other end of which is reflective so that light at $\lambda_{-1}'$ is effectively scattered by twice that length of fibre 22, being converted to $\lambda_0$ as it does so. This allows the length of wavelength shifting fibre 22 required to be halved. Furthermore, this arrangement is suitable for the case where the anti-Stokes Brillouin line is to be measured, Brillouin scattering being fundamentally a backward process, in which case the said other end of the fibre 22 need not be reflective. The coupler D is operable to transmit light at $\lambda_0$ from port 2 to port 4, which is connected to a bandpass filter 52 operable to transmit light at $\lambda_0$.

It will be appreciated that the issues of launching and collecting the various wavelengths may be difficult to resolve, if, in effect, a singly-triggered source is used, i.e, one in which the various wavelengths are generated by the same source and cannot be switched on and off independently. Such difficulties can only be resolved by some form of switching.

The switching might be accomplished at the output of the source 1, by means of a controllable filter (e.g., mechanically, using a filter wheel, Fabry-Perot etalon or monochromator arrangement, or using a variety of means of tuning the transmission electrically, e.g. acousto-optics, electro-optics, liquid crystal cell and many others). Alternatively, the switching could be accomplished by separating the optical signals into separate paths and switching these on and off using electro-optic, acousto-optic or even mechanical switches.

Although the switch could comprise integrated optics, It is conveniently a mechanical fibre-to-fibre switch, since this is low loss, relatively cheap and available. One such arrangement, which is relatively simple to implement, is a loop and input select switch 10 shown in FIG. 6. In this case, it is necessary to rely on the cross-talk of the switch being very low (so that only one fibre is addressed at any one time) and also on the very low probability that an aligned position for one input fibre will result in the second input fibre also launching light into another fibre of the output bundle.

The arrangement shown in FIG. 6 employs a network of fibre fused taper couplers A, B, C and D. Coupler A has its port 1 connected to the bandpass filter 52 passing $\lambda_0$, its port 2 connected to the switch 10 and its port 4 connected to port 2 of coupler B. Coupler B has its port 1 connected to a combined filter 5b and detector 7b for receiving light at $\lambda_0$, its port 4 connected to another combined filter 5a and detector 7a for receiving light at $\lambda_{-1}$, and its port 3 connected to port 1 of coupler C. Coupler C has its port 2 connected to the switch 10 and its port 4 connected to the delay line 21. The transmission characteristics of couplers A, B, C and D are desirably, but not essentially, as shown in the following table:-

| COUPLER | PORTS | $\lambda_0$ | $\lambda_{-1}$ |
|---------|-------|-------------|----------------|
| A | 1–2 & 3–4 | 10% | 0% |
|   | 1–3 & 2–4 | 90% | 100% |
| B | 1–2 & 3–4 | 100% | 10% |
|   | 1–3 & 2–4 | 0% | 90% |
| C | 1–2 & 3–4 | any | 50% |
|   | 1–3 & 2–4 | any | 50% |
| D | 1–2 & 3–4 | any | 10% |
|   | 1–3 & 2–4 | any | 90% |

It is important to ensure that the path from the sensing fibre 2 through couplers A to B to the $\lambda_{-1}$ detector 7a has the lowest possible loss. Some compromise has been made to allow a nominal 10% transmission from port 3 to 4 of coupler B to let the Rayleigh back-scatter, when light at $\lambda_{-1}$ has been launched into the fibre 2, to reach the $\lambda_{-1}$ detector 7a. The values given for the coupler transmissions are indicative only (100% means "as high as possible", 0% "as low as possible", 90% "not quite full transmission" and 10% "a small but finite transmission"). In FIG. 6 any unused coupler inputs are terminated for low reflection. They may be used for power monitoring.

Although the arrangements described with reference to FIGS. 6 and 7 are entirely based on fused-taper couplers, which are preferred owing to the low losses available with such couplers, clearly the same functions can be implemented in bulk optics (or even in integrated optics).

Alternatively, separate sources may be used to generate pulses at $\lambda_0$ and $\lambda_{-1}$, in which case items 21, 22 and 52, and coupler D would be removed and the source emitting at $\lambda_{-1}$ would be connected directly to port 4 of coupler C, and the source emitting at $\lambda_0$ would be connected to port 1 of coupler A.

Figure 8:
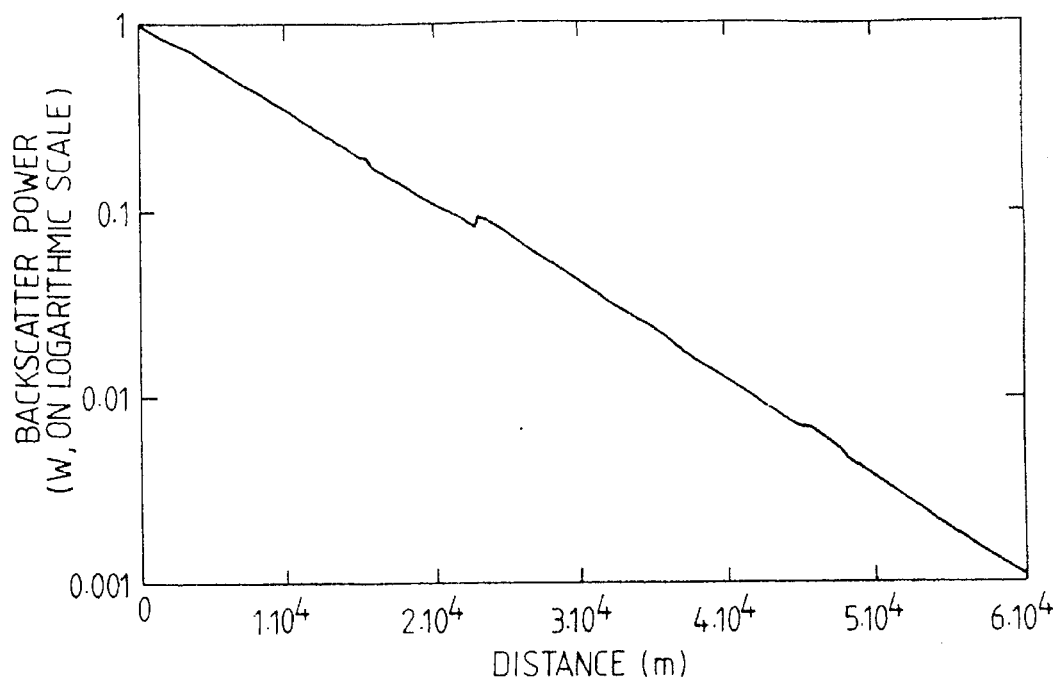
FIG. 8 shows a plot of an anti-Stokes back-scatter signal against distance along a fibre.
Figure 9:
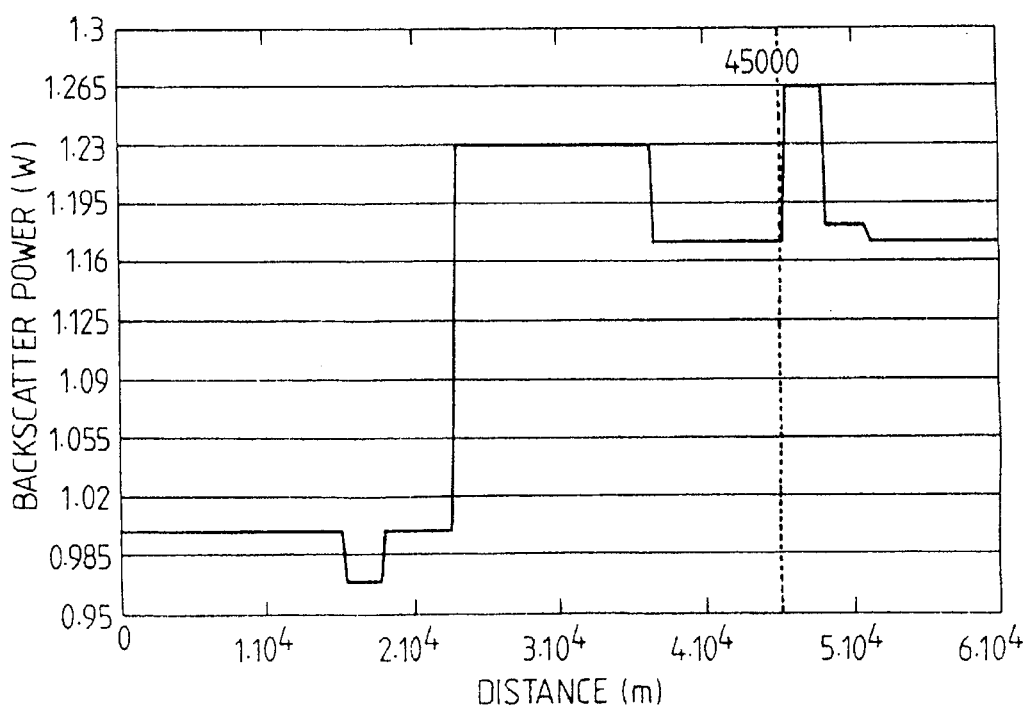
FIG. 9 shows a modified version of the plot shown in FIG. 8.
Figure 10:
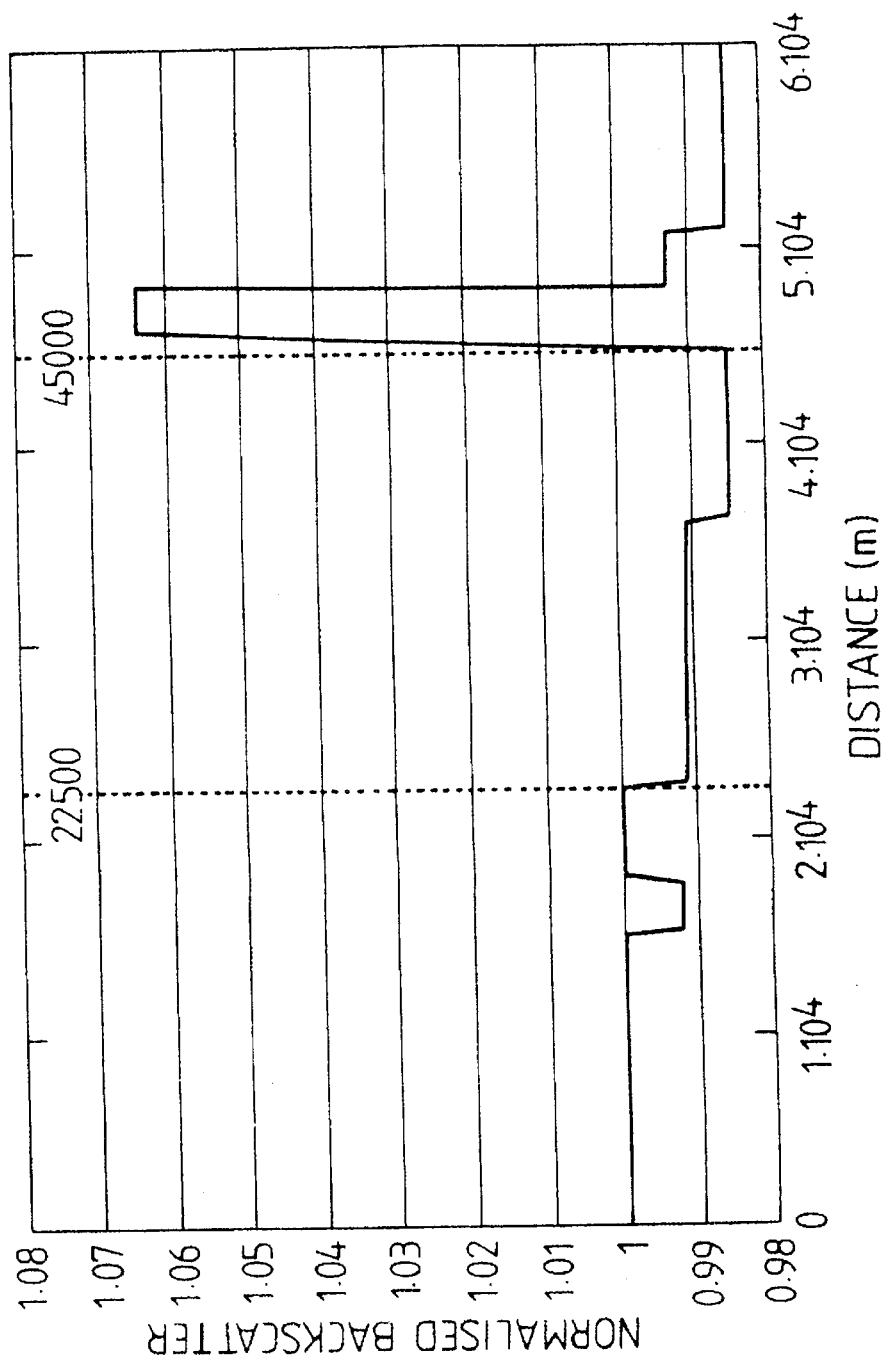
FIG. 10 shows a normalised version of the plot shown in FIG. 9.

Although it should be noted that the actual values obtained will obviously vary in dependence upon the sensing fibre used and the conditions in which measurements are made, by way of example FIGS. 8, 9 and 10 illustrate results obtained using the signal processing method described above in an arrangement comprising a single mode, step-index, non-dispersion-shifted fibre having a core refractive index of 1.45, a numerical aperture of 0.123 at distances below 22.5 km and 0.135 above that distance, a cutoff wavelength of 1.33 μm, and a nominal core radius of 4.15 μm (but raised by 10% above that value between 15 km and 18 km and beyond 36 km), when $\lambda_0$ is 1.648 μm, the Raman shift is 440 cm$^{-1}$ and the error between $\lambda_{-1}'$ and $\lambda_{-1}$ is assumed to be negligible. FIG. 8 shows the variation in the anti-Stokes back-scatter signal (normalised to 1 at 0 km) with distance in this fibre, without any allowance made for propagation losses; the departures from a straight line, on this logarithmic plot, are attributable to the above-mentioned discontinuities in the characteristics of the fibre and to the temperature being increased in a single section of fibre, between 45 km and 47 km. FIG. 9 shows the signal with the effect of the propagation losses removed; however, variation in the back-scatter capture fraction along the fibre still causes distortion. When the anti-Stokes back-scatter signal is divided, point-by-point, by the geometric mean of the two Rayleigh scatter measurements at $\lambda_0$ and $\lambda_{-1}'$, the graph shown in FIG. 10 is obtained.

The curve in FIG. 10, which is the function containing the temperature information retrieved using the proposed form of signal processing, shows the anticipated error caused by changes in the fibre core diameter (10% change at 15–17 km), fibre numerical aperture (10% change at 22.5 km) and the combined effect of raised numerical aperture and core diameter beyond 36 km. To get a feel for scale, the feature between 45 km and 47 km shows the effect of a localised 10° C. increase in temperature. As can be seen, the changes in core diameter and numerical aperture result in a measurement error of just over 1° C.

The techniques used in the prior art for calibration of the fibre with respect to variation in attenuation due to factors independent of the physical parameter being measured, for example the scattering coefficient or capture fraction of the fibre, and for improving the spatial resolution along the fibre, may be employed in apparatus embodying the present invention.

Figure 11:
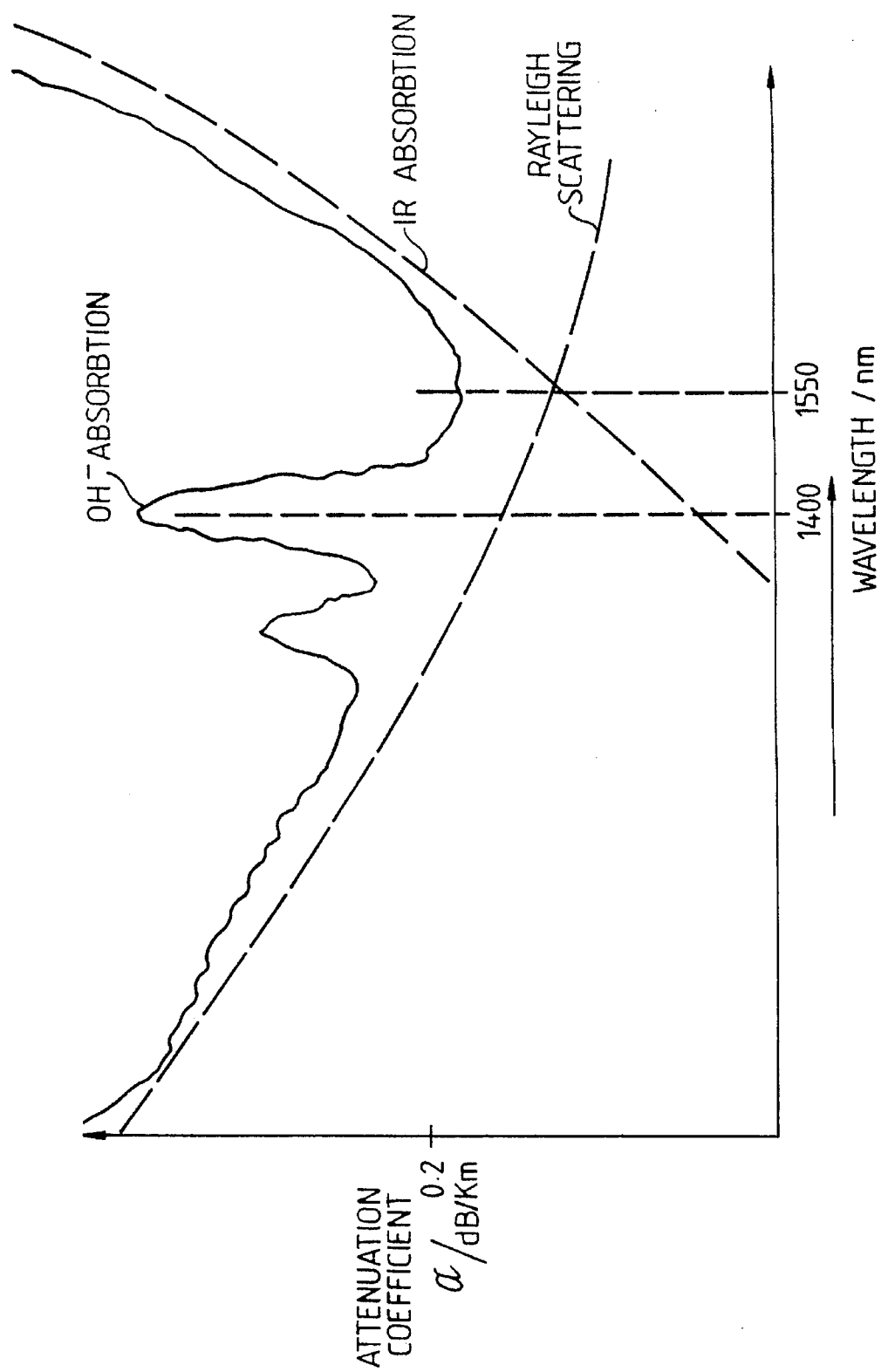
FIG. 11 is a graph illustrating the variation in attenuation coefficient with wavelength for a typical fibre.

The fibres 2 used in apparatus embodying the present invention may be any one of the multi-mode, single mode or single polarisation types, depending upon the particular application. Unless otherwise indicated, the embodiments described in the present application employ a fibre which is low loss, dispersion compensated, and has a linear attenuation coefficient minimum at 1550 nm. The attenuation coefficient for such a fibre type is shown in FIG. 11.

For maximum dispersion compensation, the fibre is desirably a single mode fibre. Whilst not always giving the best possible performance, measurements on single mode fibres also have the advantage of using comparatively cheap fibre and, more importantly, often fibre which is already installed along the structure to be monitored, for example, power cables.

A source 1 suitable for use with such a fibre 2 produces pulses of optical radiation having a typical half power duration of 40 to 80 ns at a selected wavelength, and has a peak power which can be varied between around 1W to many tens of Watts. The source is conveniently but not necessarily an amplitude modulated semiconductor laser, the output of which is amplified by an Er (Erbium)-doped fibre amplifier before being launched into the sensing fibre. This source has the benefit of being available from many suppliers of telecommunications equipment and, moreover, it allows the average power launched into the fibre to be increased by employing pulse compression coding schemes. Such schemes are relatively simple to implement owing to the ease of modulation of the semiconductor laser by the variation of its bias current.

Alternatively, the source 1 may be a diode-pumped solid state loser, in particular a Q-switched Er-doped fibre laser, the output spectral width of which is preferably below 20 nm with a pulse half power width which can be controlled by varying the length of the fibre in its cavity. Such a Q-switched laser, which is cheaper than the source mentioned above, may be pumped at 980, 1480 or 810 nm using a semiconductor laser or at 514 nm using other lasers such as Ti:sapphire lasers, certain dye lasers and the like. Semiconductor lasers are likely to be the most convenient pumping source, being potentially cheap, energy efficient and compact.

Another alternative is for the source 1 to be a bulk-optic Er:glass laser.

Control of the pulse width of the source used is required to maximise, for particular fibre types, the injected energy by increasing its peak power and/or duration since this determines the temperature resolution of the device whilst maintaining a minimum spatial resolution which is degraded with increased pulse duration.

To achieve high loss at $\lambda_{+1}$, whilst retaining low loss properties of the fibre at the wavelengths of interest, one or more of the following techniques may be employed (although it should be noted that other suitable techniques, not described below, could be used). The techniques are described for the case where the measurements are to be based on the Rayleigh scattered signal at $\lambda_0$ and the anti-Stokes Raman signal at $\lambda_{-1}$' but can readily be adapted (where necessary) for situations where other spectral bands are to be used.

Greater attenuation at the Stokes wavelength $\lambda_{+1}$ can be achieved by selecting $\lambda_0$ such that $\lambda_0$ and $\lambda_{-1}$ lie roughly symmetrically about a transmission window, i.e. on either side of a local attenuation minimum. However, $\lambda_0$ can be selected such that $\lambda_{+1}$ coincides with a local absorption maximum (or lies substantially on the short wavelength edge of such a maximum), owing for example to the IR absorption band or absorption bands caused by naturally-occurring or doped impurities in the fibre. Conveniently the long wavelength edge of the transmission band at 1550 nm is the IR absorption band (see FIG. 11), and $\lambda_0$ can be selected such that the loss at $\lambda_{+1}$ is at least 3 times higher than if $\lambda_0$ and $\lambda_{-1}$ were placed symmetrically about the centre of the transmission window, resulting in an appreciable increase in the usable power level. Local absorption maxima occur in fibres owing to naturally-occurring impurities such as hydroxide ions and hydrogen gas. The local absorption maximum for hydroxide ions is at 1390 nm, so a $\lambda_0$ of about 1310 nm could conveniently be used (or 1320 nm using a Nd:YAG source). Where it is possible to employ a special fibre it may be doped, with rare earth ions for example, so as to provide a local attenuation maximum at $\lambda_{+1}$. Similarly advantage could be taken of the local absorption maxima provided by dopants already in the fibre.

Figure 12:
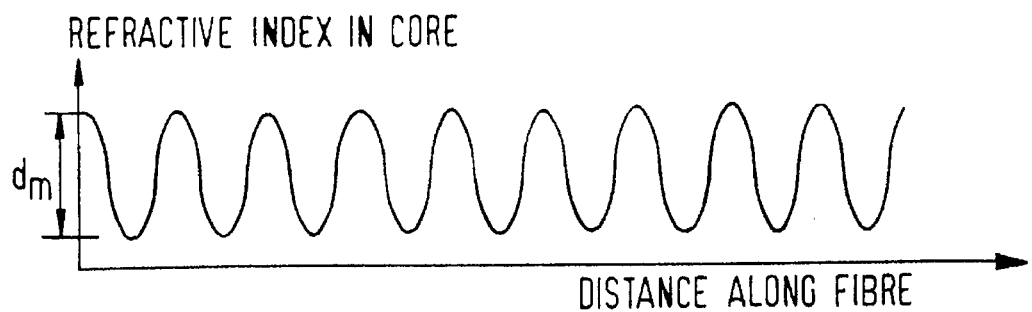
FIG. 12 is a graph showing a refractive index profile along the core of an optical fibre with built-in grating.

Another possibility is to provide a special fibre having built-in gratings, for example formed by colour-centre generation under UV illumination. These built-in gratings may be formed by modulating the refractive index profile of the core of the fibre, as shown in FIG. 12. The depth $d_m$ of this modulation may be typically $3\times10^{-4}$ or less. Such gratings are reflective in a highly wavelength-specific manner, and may be incorporated either continuously or at intervals throughout the fibre so as to prevent the build-up of power at $\lambda_{+1}$.

Figure 13A:
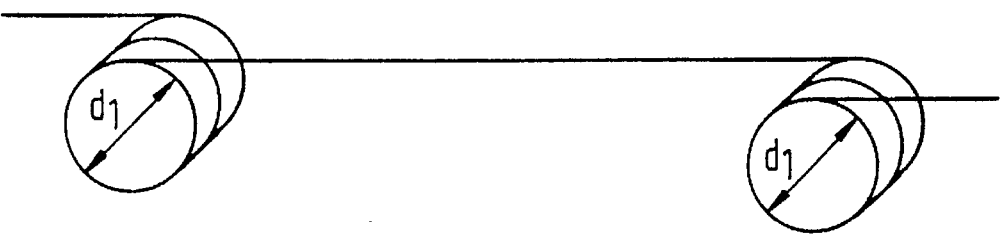
FIGS. 13(A) and 13(B) are schematic diagrams of respective methods of producing periodic mechanical perturbations in an optical fibre.
Figure 13B:
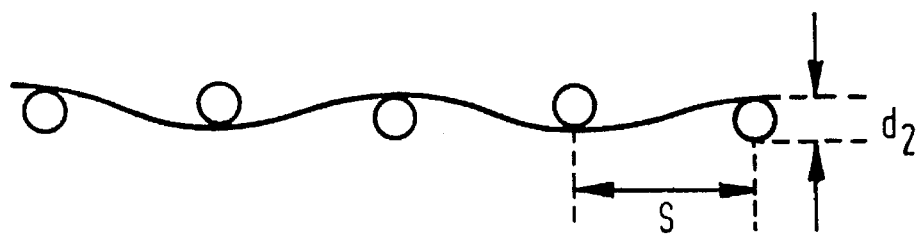

Alternatively, it may be possible to arrange for $\lambda_{+1}$ to have substantially higher losses due to bending than $\lambda_0$ or $\lambda_{-1}$. This may be done without perturbing the fibre, by choosing $\lambda_0$ to be as long as possible relative to the cut-off wavelength of the fibre. In practice a given fibre will suffer increasing bend loss as the wavelength increases from the centre of the transmission window. If possible, bends could deliberately be induced in the fibre, either along its entire length by some form of structure in the cable, for example a helical arrangement, a corrugation inside the cable or random roughness, or at intervals along the fibre, for example by applying a periodic mechanical perturbation, as shown in FIGS. 13(A) and 13(B). In any case the bends are chosen in their amplitude, radius of curvature and periodicity to increase the loss at $\lambda_{+1}$ whilst having a minimal effect on the other wavelengths of interest.

One method of applying a periodic mechanical perturbation to a fibre is shown in FIG. 13(A). Using this method a typical installed single mode fibre, in which a short length, for example a few tens of meters, has been bent into a coil of carefully chosen diameter $d_1$ and housed in a protective enclosure, can have a loss of around 10 dB at $\lambda_{+1}$, with an increased loss of only 0.1 dB at $\lambda_0$.

Figure 14:
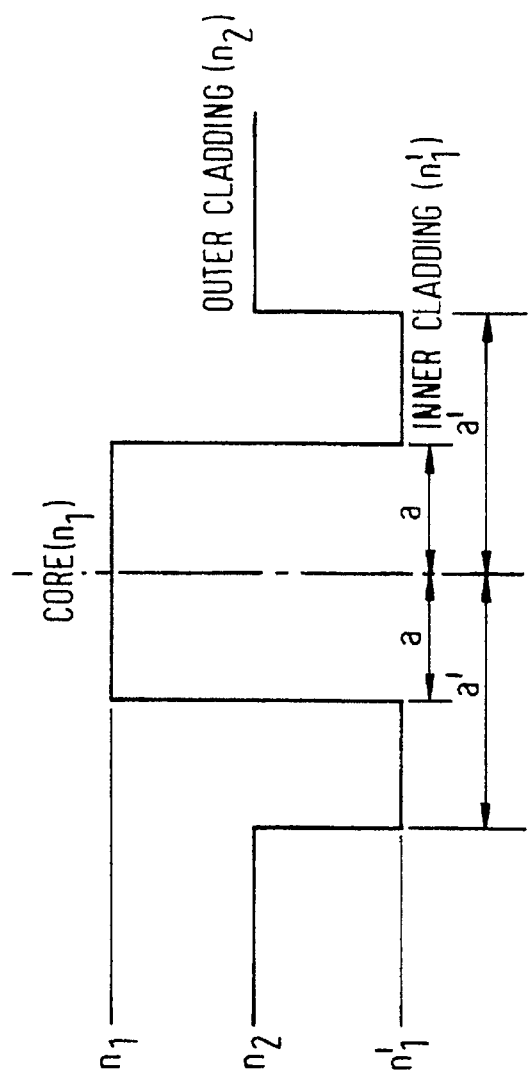
FIG. 14 is a graph showing a refractive index profile of an optical fibre.

Another method of applying such a perturbation to a fibre is shown in FIG. 13(B). The amplitude $d_2$ and the period s are chosen so as to maximise attenuation at $\lambda_{+1}$, while minimising attenuation at $\lambda_0$ and $\lambda_{-1}$, while minimising attenuation at $\lambda_0$ and $\lambda_{-1}$, for example by using a fibre with a refractive index profile as shown in FIG. 14. Typically, the relationship between the core radius (a) and the inner cladding radius (a') would be:

$$1.2a < a' < 3a.$$

The refractive indices of the core, inner cladding and outer cladding are represented by $n_1$, $n_1'$, and $n_2$ and would typically have the following relationship:

$$5(n_1-n_2) > n_2-n_1' > 0.2(n_1-n_2).$$

A further technique for inducing high loss at $\lambda_{-1}$ is to launch a "guard" signal at a wavelength $\lambda_{+2}$, where $\lambda_{+2}=\lambda_{+1}+\lambda_s$ ($\lambda_s$ equals the wavelength shift due to an inelastic scattering process), simultaneously into the fibre with a signal at $\lambda_0$. In this way, as soon as light at $\lambda_{+1}$ is generated by spontaneous emission it will be converted by stimulated scattering to light at $\lambda_{+2}$, thereby preventing the build-up of light at $\lambda_{+1}$ and hence delaying the onset of problems due to stimulated scattering of light at $\lambda_0$.

This technique will be explained further with reference to FIG. 15(A), which shows guard signal generating means 12 which generate a guard signal at $\lambda_{+2}$, the second order Raman Stokes wavelength. The guard signal generating means 12 are desirably placed between the source 1 and first directional coupler 4a in the apparatus of FIG. 4(A) such that optical radiation is launched into the coupler 4a simultaneously at the two wavelengths $\lambda_0$ and $\lambda_{+2}$.

Figure 15A:
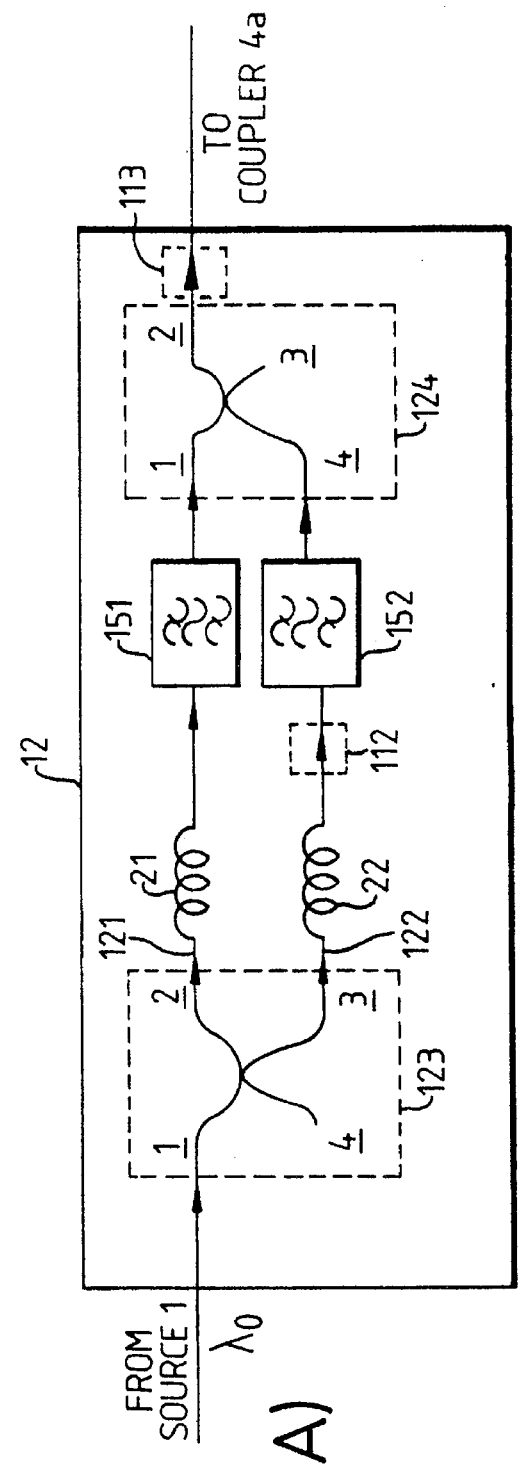
FIG. 15(A) is a schematic diagram illustrating a part of apparatus embodying the second aspect of the present invention.

The source signal $\lambda_0$ entering the guard signal generating means 12 in FIG. 15(A) is split into two components 121, 122, either by a signal splitter 123, for example one made from bulk optics or an all-fibre directional coupler such as a fused taper coupler or polished coupler. The components 121, 122 then pass through respective lengths of coiled fibre 21, 22, one comprising a fibre 22 with enhanced Raman scattering properties and the other 21 acting as a delay line with low Raman gain characteristics. The Raman scattering properties of fibre 22 may be enhanced in a number of ways. For example, the fibre 22 may be doped with $GeO_2$, or may chosen so as to have a large refractive index difference (for example, owing to a large concentration of $GeO_2$ additive), which results in a smaller mode field and hence an increase in the optical intensity, or may be chosen so as to be a polarisation maintaining fibre, thereby doubling the stimulated scattering gain coefficient compared to a non-polarisation maintaining fibre (the length of which would have to be double that of the polarisation maintaining fibre to achieve the same Raman gain, given the same conditions). Conversely, the delay line fibre 21 can be made to have reduced Raman gain by keeping the index difference and $GeO_2$ concentration in the core to moderate levels and choosing a non-polarisation maintaining fibre. The signals passing through the high Raman gain fibre 22 are converted through stimulated Raman scattering from $\lambda_0$ to $\lambda_{+2}$, the signals passing through the delay line fibre 21 emerging therefrom having an approximately similar time delay as the scattered signals in the other fibre. The two separate signals at $\lambda_0$, $\lambda_{+2}$ then pass, via filters 151, 152, to a common output 124, such as a dichroic coupler or other suitable means, at which the separate signals are recombined. If no filtering 151, 152 is included, many orders of Stokes and anti-Stokes signals may be emitted which can reduce the effectiveness of the guard signal.

If it could be possible to propagate signals without the increased attenuation that exists at the second order ($\lambda_{+2}$) in the fibre, the range limitation resulting from stimulated Raman scattering could be lifted and the power limitation on the source, at the first wavelength $\lambda_0$, would be then limited by other effects, In theory, several orders of magnitude in the range and received power from back-scattered signals could be gained. In practice, however, the power at the second order $\lambda_{+2}$ is itself converted to a third order $\lambda_{+3}$, owing to stimulated scattering as it propagates along the sensing fibre, and its action as a guard pulse gradually diminishes. Nevertheless, very useful gains in transmitting power can be achieved, and, furthermore, the onset of Raman scattering at $\lambda_{+2}$ may be suppressed or delayed as described above with reference to the first embodiment, or indeed a third pulse at a fourth order $\lambda_{+4}$ (=$\lambda_{+3}$+scattering shift) could also be launched simultaneously with the second order $\lambda_{+2}$ to restrict the losses from the signal at the second order $\lambda_{+2}$.

Figure 15B:
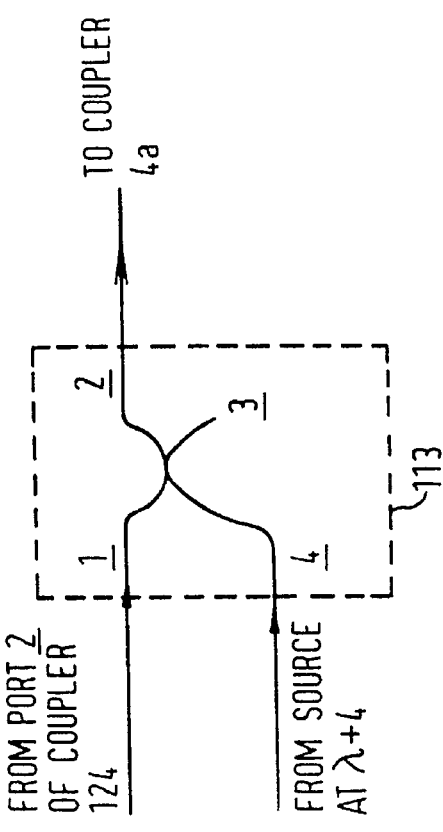
FIGS. 15(B) and 15(C) are schematic diagrams of optional portions of the part of FIG. 15(A)

This third pulse ($\lambda_{+4}$) may be derived from the $\lambda_{+2}$ pulse in the same way as the $\lambda_{+2}$ pulse is derived from the $\lambda_0$ pulse, or may be supplied from an independent source. A coupler 113, shown in detail in FIG. 15(B), can be connected to the port 2 of coupler 124 of FIG. 15(A), so that the $\lambda_{+4}$ pulse may be launched into the fibre. Alternatively, coupler 113 could be inserted between the coupler 124 and either of the filters 151 and 152.

The preferred power at each order depends, of course, on the attenuation of the relevant wavelength in the fibre concerned, necessitating that it be possible to set the power of each signal at each wavelength independently of the others in order to maximise the propagation of the test signal at the first wavelength. The wavelength of the guard pulse must also lie within the bandwidth of the Raman gain coefficient for the fibre, which for silica fibres is quite broad (200 $cm^{-1}$ or so), in order that sufficient Raman scattering occurs at each wavelength. The width or duration of the guard pulse should be chosen to be greater than that of the source pulse in order to allow for chromatic dispersion of the two signals over the lengths of interest.

Figure 15C:
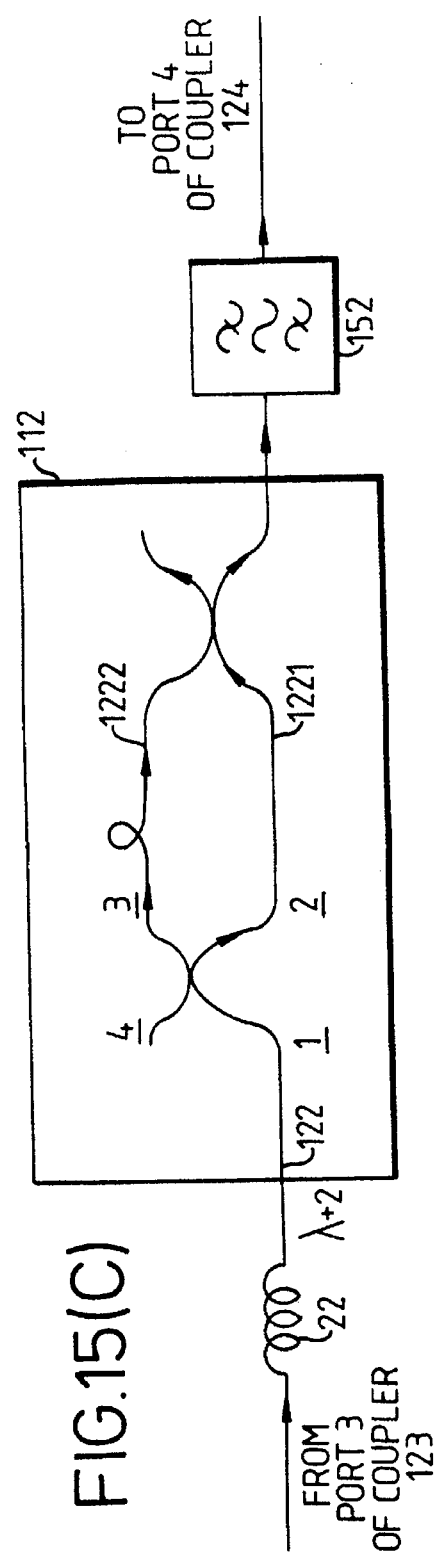

The pulse width of the guard signal may be increased by a fibre network arrangement 112 such as shown in FIG. 15(C), which is inserted between the Raman gain fibre 22 and the filter 152. The fibre network arrangement 112 comprises a beam splitter for splitting the light emerging from the Raman gain fibre 22 into two components and two fibres 1221, 1222, for receiving respective components of the signals, one of the fibres 1222 being longer than the other such that the component passing through it is delayed by approximately half the pulse width. The two components are then recombined and passed to the filter 152.

Although the embodiments discussed above have been described largely with reference to prevention of stimulated Raman scattering, it should be noted that similar techniques could be employed so as to inhibit growth in the fibre of light at the first order Brillouin Stokes wavelength, thereby delaying the onset of problems due to stimulated Brillouin Scattering.

As mentioned earlier, stimulated scattering also decreases the linear range of measurements taken when characterising fibres using optical time domain reflectometers. Since in this case measurements must be carried out at a pre-specified wavelength on a standard fibre in a well specified deployment state, there is no opportunity to employ the techniques discussed with reference to the first embodiment, for example, selecting an appropriate source wavelength, doping the fibre, or inducing bending losses. However, launching a second pulse into the fibre as a guard signal would in most circumstances be unobjectionable, and would increase the linear measurement range.

Using methods and apparatus embodying the present invention, increased power may therefore be launched into the fibre to increase the sensing range before non-linear effects start to dominate.

Generally, the test wavelength (for use in apparatus which may or may not be such as that shown in preceding Figures) is also chosen so as to minimise the transmission loss for the particular fibre and conditions used, as will be explained below.

Figure 16:
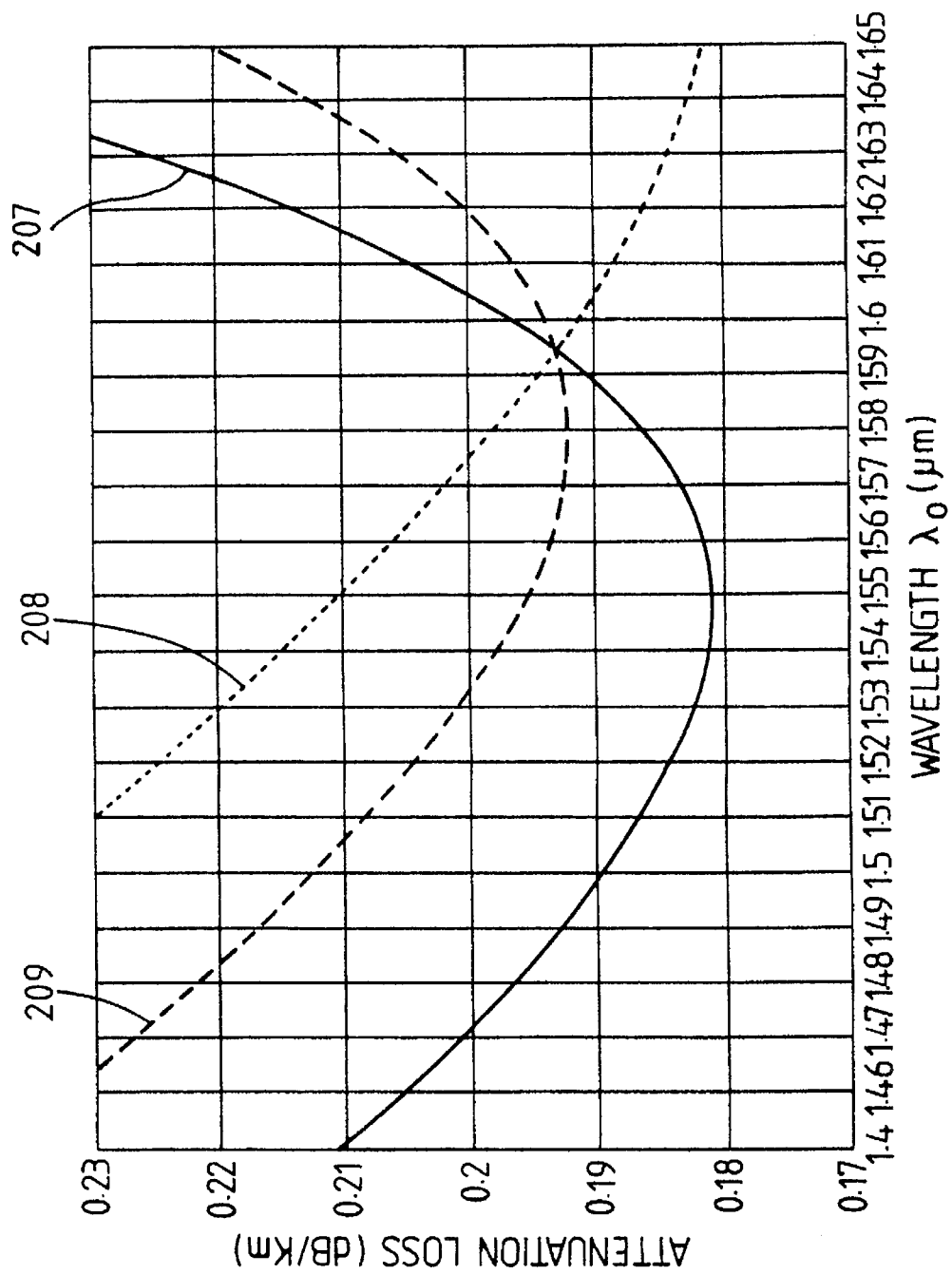
FIGS. 16, 17, 18(a) and 18(b) show respective graphs for use in explaining a procedure for selecting a test wavelength.

When choosing a test wavelength, account is desirably taken of the average value of the losses at the test and detected wavelengths. When detecting a Brillouin line the frequency shift is so small that there is no appreciable change in loss between the wavelengths, unless it is introduced artificially (e.g. narrow band grating), but for Raman lines, however, the frequency shift is such as to result in significant changes in attenuation. FIG. 16 is a graph illustrating the loss of a single mode fibre (step-index, non-dispersion-shifted, core refractive index 1.45) as a function of wavelength. The solid curve 207 represents the loss at the test wavelength $\lambda_0$, and the dotted curve 208 shows the loss at the wavelength $\lambda_{-1}$ of the Raman anti-Stokes signal resulting from a test pulse at wavelength $\lambda_0$. As expected, the solid curve 207 has a minimum around 1550 nm and the anti-Stokes loss is at a minimum if $\lambda_0$ is around 1650 nm (such as to generate an anti-Stokes signal at the loss minimum of the fibre). As shown by the dashed curve 209, which represents the average loss $[\alpha(\lambda_0)+\alpha(\lambda_{-1})]/2$ at the two wavelengths $\lambda_0$, $\lambda_{-1}$, for a given $\lambda_0$, the minimum overall loss is for a test wavelength somewhere in between, at around 1590 nm.

Figure 17:
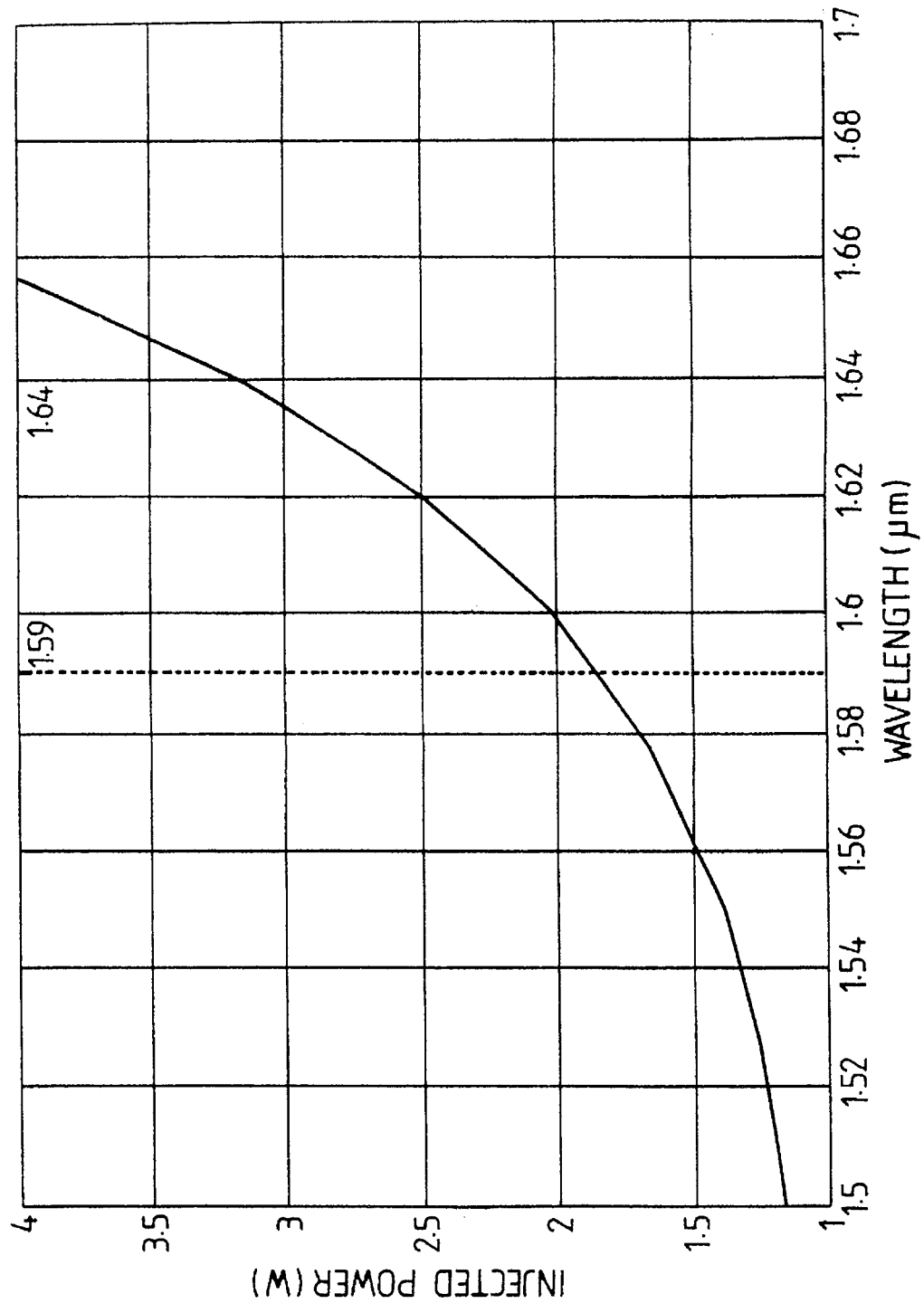
Figure 18A:
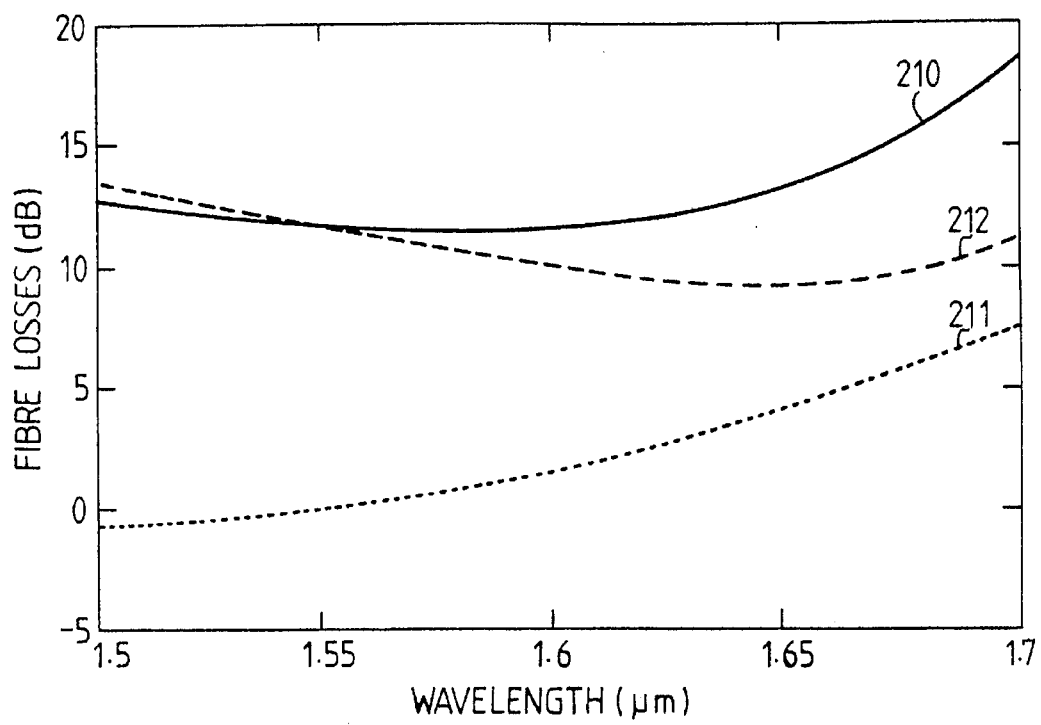
Figure 18B:
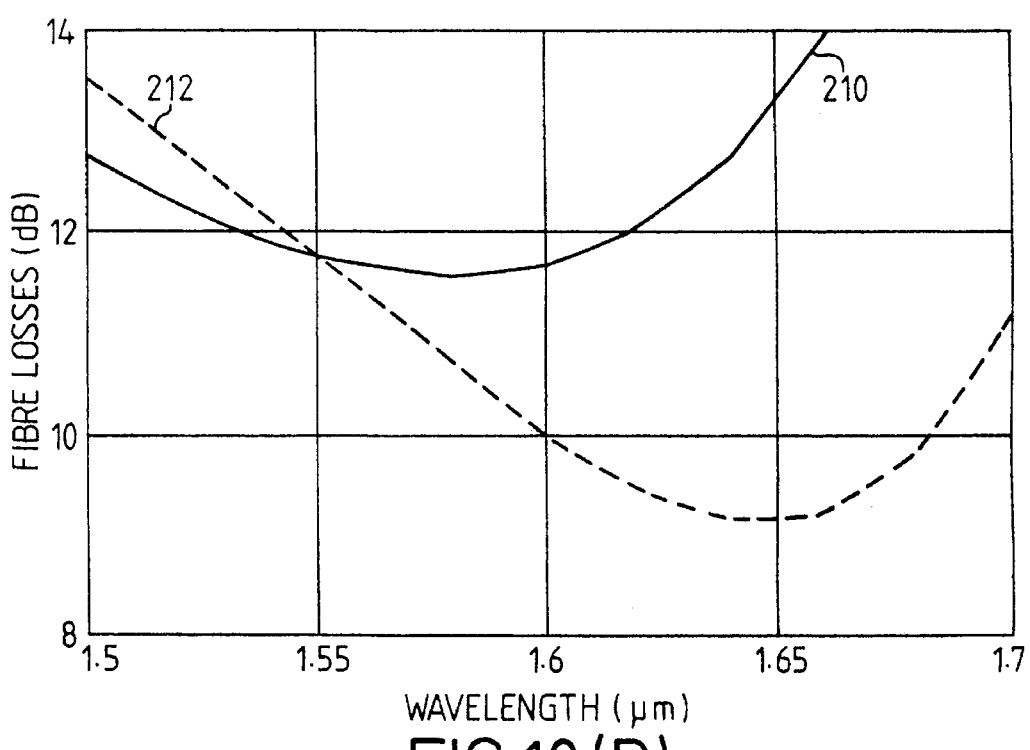

However, the choice of test wavelength is not always that simple, so the attenuation of the fibre increases rapidly with increasing wavelength beyond 1550 nm owing to the infrared absorption, so that the power that can be launched into the fibre before non-linear effects take place is also a function of wavelength. FIG. 17 is a graph illustrating, as a function of test wavelength, the power level at which the fibre loss increases on average (over 80 km) by 0.01 dB/km owing to stimulated Raman scattering in an Industry-standard single mode fibre (NA=0.124, cutoff=1334 nm). As can be seen, a substantial increase in launched power must be used as the test wavelength increases. This must be balanced against considerations of fibre attenuation; such a comparison can only be made for a particular length of sensing fibre. By way of example, FIG. 18(A) shows the fibre losses (solid curve 210) for a 30 km single mode fibre (dB total loss after two-way propagation), together with a benefit factor (dotted curve 211; also shown in dB, normalised to 0 dB at 1550 nm) attributable to the variation of allowable launch power with test wavelength, FIG. 18(B) showing the same data on an expanded scale. The dashed curve 212 (given by the difference between the solid and dotted curves) shows how including the improved launch power at the longer wavelength shifts the optimum wavelength from 1590 nm to 1640 nm, for 30 km of fibre. It should be noted that the use of artificial methods to suppress the stimulated scattering could alter this value.

Thus, if one is not able to supply enough power to be limited by non-linear effects, one can choose a preferred test wavelength corresponding to the minimum overall fibre loss, i.e. where the sum or average of the losses at the test and detected wavelengths (or the sum or average of the losses at the test and the most critical of the detected wavelengths, where there is more than one detected wavelength) is minimised. Where all signals lie close to each other (e.g. Brillouin scattering) this preferred wavelength is around 1550 nm. For Raman scattering, the optimum test wavelength is around 1590 nm, at which wavelength the sum or average of the losses at the probe and anti-Stokes wavelengths is minimised.

When ample source power is available, the preferred test wavelength may be altered slightly, as discussed above, because a changed test wavelength might result in an increase in the allowable launch power to a greater extent than the (linear) fibre loss is increased by the change in the test wavelength. In other words, the wavelength is preferably chosen to give the best throughput at a defined distance in the fibre, when the effect of fibre loss on the maximum launch power is taken into account. Owing to the availability of convenient sources, an especially convenient wavelength is around 1620 nm to 1680 nm which is generated from sources suitable for the low-loss window of silica fibres around 1550 nm.

Figure 19:
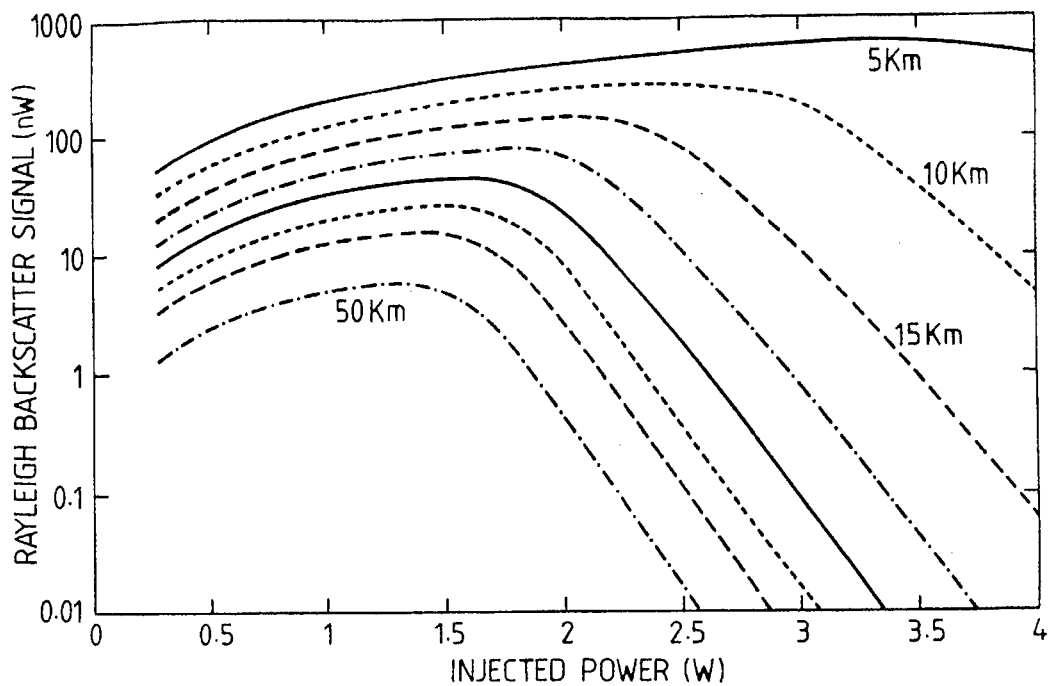
FIGS. 19 and 20 show respective graphs for use in explaining a procedure for selecting a power level of a test wavelength.
Figure 20:
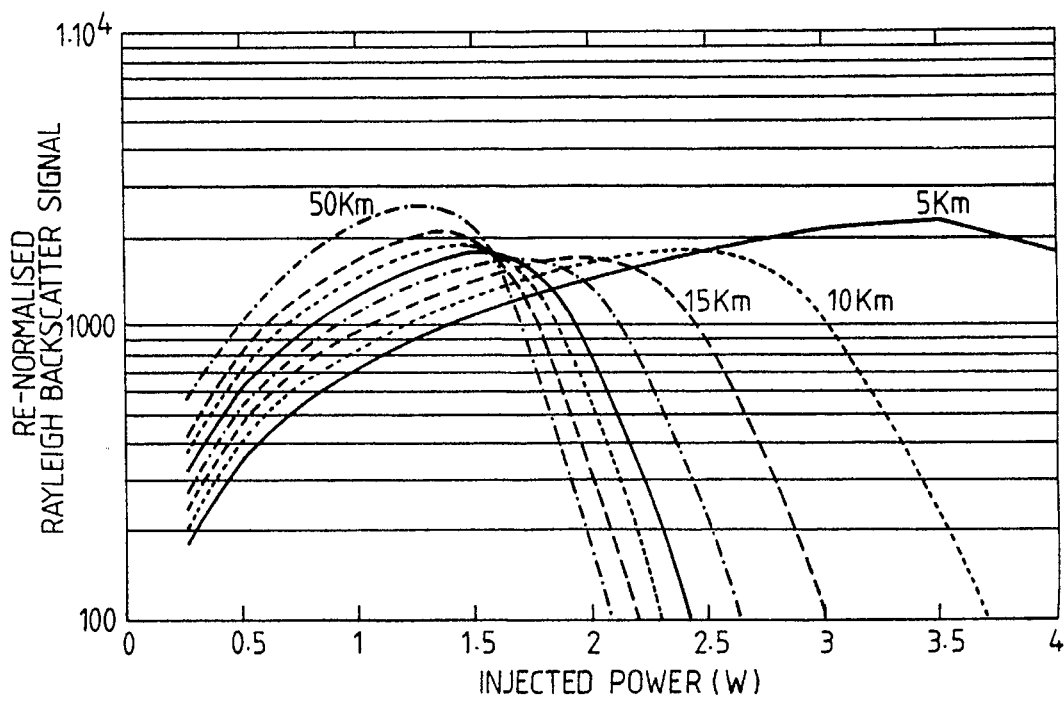

The criterion used in preparing FIG. 17, that is limiting the power level to one which causes a certain average increase in optical loss at the test wavelength over a certain fibre length, is a somewhat crude means of determining the best power to launch into the fibre. Assuming that sufficient source power is available, then a more precise way of optimising the system performance is to adjust the power launched into the fibre to maximise the test power conveyed to the most remote point to be monitored. There is a clear optimum, since, at lower powers than a certain value, more power could be launched in and therefore more returned; at higher powers, the benefit of more initial power is more than offset by higher losses due to non-linear effects. FIGS. 19 and 20 show the (calculated) variation of Rayleigh backscatter power returned from a given distance along a standard single mode fibre (non-dispersion-shifted, designed for operation at 1550 nm) as a function of the power launched (for a pulse width of 80 ns). Owing to the non-linear effects, this is not a monotonic function of launched power; for each distance, there is an optimum power which maximises the back-scatter (Rayleigh or anti-Stokes Raman) returned from that point.

In the case where back-scattered signals at the anti-Stokes and Stokes wavelengths are both employed and source power is low enough to ignore stimulated scattering, it can be more difficult to optimise the probe wavelength, since (a) three wavelengths are now involved, (b) the strength of the anti-Stokes and Stokes wavelengths, when generated, differ, and (c) the losses differ. In general, one would arrange the incident wavelength to be roughly in the center of the transmission loss window (e.g. 1550 nm). In this case, the performance would be worse than in the approach proposed above, since the Raman wavelengths would both suffer higher transmission losses than the incident wavelength. This discussion is of course primarily relevant to Raman scattering, since the wavelength separation for Brillouin is far narrower.

It should be noted that there are circumstances where one might wish to suppress stimulated scattering, even if not working at a wavelength which minimises the transmission loss. One example might be where the desired range (distance coverage) of the sensor is relatively short, but the performance must be optimised in other respects (for short measurement time or high spatial resolution); in this case one would wish to transmit as much power as possible. There may be other reasons for not working at a wavelength which minimises the loss. For example, in short distances, the loss of the fibre itself becomes less significant, or there may be other considerations, such as the intensity of the back-scatter signal which increases as the wavelength is reduced, or detector efficiency, which improves markedly below about 1100 nm where silicon detectors may be used.

Similarly, there may be occasions where, owing to the use of a test wavelength which minimises the transmission loss and hence increases the range over which sensing can be carried out before stimulated scattering effects become significant, it is not necessary or desirable to design the system so as to suppress stimulated scattering in the manner discussed earlier.

What I claim is:

1. An optical time domain reflectometry method of sensing respective values of a physical parameter at different locations along an optical fibre, deployed through a region of interest, in which method optical radiation at a first wavelength ($\lambda_0$) is launched into the fibre and back-scattered optical radiation in at least one preselected spectral band is used to produce output signals dependent upon the values being sensed, wherein none of the spectral bands used to produce said output signals lies about a second wavelength ($\lambda_{+1}$) which is equal to the wavelength on which a first order Stokes spectral band, which results from inelastic scattering in the fibre of optical radiation at said first wavelength ($\lambda_0$), is centred, and wherein said first wavelength ($\lambda_0$) and/or said optical fibre are chosen and/or arranged such that relative growth in the intensity in the fibre of optical radiation at said second wavelength ($\lambda_{+1}$) is arranged to be inhibited, thereby to suppress conversion in the fibre through stimulated scattering of optical radiation at said first wavelength ($\lambda_0$) to optical radiation at said second wavelength ($\lambda_{+1}$).

2. A method as claimed in claim 1, wherein none of the spectral bands used to produce said output signals lies about a further wavelength which is equal to the wavelength on which a further first order Stokes spectral band, which results from another inelastic scattering process in the fibre of optical radiation at said first wavelength ($\lambda_0$), is centred, and relative growth in the intensity in the fibre of optical radiation at said further wavelength is also inhibited, thereby to suppress conversion in the fibre through stimulated scattering of optical radiation at said first wavelength ($\lambda_0$) to optical radiation at said further wavelength.

3. A method as claimed in claim 1, wherein the said one preselected spectral band is an anti-Stokes band resulting from Raman scattering in said fibre.

4. A method as claimed in claim 1, wherein the said one preselected spectral band is an anti-Stokes band resulting from Brillouin scattering in said fibre.

5. A method as claimed in claim 3, wherein back-scattered optical radiation at another preselected spectral band, including said first wavelength ($\lambda_0$), is used in addition to said one preselected spectral band to produce said output signals.

6. A method as claimed in claim 1, wherein said first wavelength ($\lambda_0$) is selected in accordance with a predetermined attenuation characteristic of the fibre such that said first wavelength ($\lambda_0$) and the said one preselected spectral band lie adjacent to a local attenuation coefficient minimum but said second wavelength ($\lambda_{+1}$) is displaced from said local attenuation coefficient minimum, optical radiation at said second wavelength ($\lambda_{+1}$) thereby being attenuated to a significantly greater extent than optical radiation at said first wavelength ($\lambda_0$) or in the one preselected spectral band.

7. A method as claimed in claim 1, wherein optical radiation at a third wavelength ($\lambda_2$), equal to the wavelength on which a first order Stokes spectral band, which results from inelastic scattering in the fibre of optical radiation at the said second wavelength ($\lambda_{+1}$), is centred, is launched into the fibre simultaneously with said optical radiation at said first wavelength ($\lambda_0$), thereby to cause optical radiation at said second wavelength ($\lambda_{+1}$) to be converted to optical radiation at said third wavelength ($\lambda_{+2}$) through stimulated scattering, so as to achieve the desired inhibition in growth of optical radiation at said second wavelength ($\lambda_{+1}$).

8. An optical time domain reflectometry method of characterising an optical fibre, in which optical radiation at a preset first wavelength ($\lambda_0$) is launched into the fibre and optical radiation back-scattered along the fibre is used to measure a selected characteristic of the fibre, wherein, so as to inhibit growth in the intensity in the fibre of optical radiation at a second wavelength ($\lambda_{+1}$), equal to the wavelength on which a first order Stokes spectral band, which results from inelastic scattering in the fibre of optical radiation at said preset first wavelength ($\lambda_0$), is centred, optical radiation at a third wavelength ($\lambda_{+2}$) is launched into the fibre simultaneously with optical radiation at said preset first wavelength ($\lambda_0$), said third wavelength ($\lambda_{+2}$) being selected so as to be equal to the wavelength on which a first order Stokes spectral band, which results from inelastic scattering in the fibre of optical radiation at said second wavelength ($\lambda_{+1}$), is centred, thereby causing optical radiation at said second wavelength ($\lambda_{+1}$) to be converted to optical radiation at said third wavelength ($\lambda_{+2}$) and so suppressing conversion in the fibre of optical radiation at said preset first wavelength ($\lambda_0$) to optical radiation at said second wavelength ($\lambda_{+1}$) through stimulated scattering.

9. A method as claimed in claim 7 or 8, wherein, to inhibit growth in intensity in the fibre of optical radiation at a fourth wavelength ($\lambda_3$), equal to the wavelength on which a first order Stokes spectral band, which results from inelastic scattering in the fibre of optical radiation at the said third wavelength ($\lambda_{+2}$), is centred, optical radiation at a fifth wavelength ($\lambda_{+4}$), equal to the wavelength on which a first order Stokes spectral band, which results from inelastic scattering in the fibre of optical radiation at the said fourth wavelength ($\lambda_{+3}$), is centred, is launched into the fibre simultaneously with the optical radiation at said third wavelength ($\lambda_{+2}$), thereby to cause optical radiation at said fourth wavelength ($\lambda_{+3}$) to be converted to optical radiation at said fifth wavelength ($\lambda_{+4}$) through stimulated scattering.

10. Optical time domain reflectometry apparatus for sensing respective values of a physical parameter at different locations through a region of interest, which apparatus comprises an optical fibre adapted to be deployed through said region of interest, source means for launching optical radiation at a first wavelength ($\lambda_0$) into the fibre, and detection means for receiving optical radiation back-scattered along the fibre from which respective values of the physical parameter can be derived, wherein filtering means are provided for restricting the back-scattered radiation used to derive said values to one or more preselected spectral bands, none of which lies about a second wavelength ($\lambda_{+1}$) which is equal to the wavelength on which a first order Stokes spectral band, which results from inelastic scattering in the fibre of optical radiation at said first wavelength ($\lambda_0$), is centred, and the said source means and/or the said optical fibre are selected and arranged so as to inhibit growth in the intensity in the fibre of optical radiation at said second wavelength ($\lambda_{+1}$), thereby to suppress conversion in the fibre through stimulated scattering of optical radiation at said first wavelength ($\lambda_0$) to optical radiation at said second wavelength ($\lambda_{+1}$).

11. Apparatus as claimed in claim 10, wherein the said one preselected spectral band is an anti-Stokes band resulting from Raman scattering in said fibre.

12. Apparatus as claimed in claim 10, wherein the said one preselected spectral band is an anti-Stokes band resulting from Brillouin scattering in said fibre.

13. Apparatus as claimed in claim 11, wherein another preselected spectral band used to produce said output signals lies about said first wavelength ($\lambda_0$).

14. Apparatus as claimed in claim 10, wherein said source means are selected in accordance with a predetermined attenuation characteristic of the fibre such that said first wavelength ($\lambda_0$) and the said one or more spectral bands lie adjacent to a local attenuation coefficient minimum but said second wavelength ($\lambda_{+1}$) is displaced from said local attenuation coefficient minimum, optical radiation at said second wavelength ($\lambda_{+1}$) thereby being attenuated to a significantly greater extent than optical radiation at said first wavelength ($\lambda_0$) and in the or each spectral band.

15. Apparatus as claimed in claim 14, wherein the said source means are selected such that said second wavelength ($\lambda_{+1}$) coincides with an infra-red absorption maximum in the attenuation characteristic of the fibre or lies substantially on the short-wavelength edge of such an absorption maximum.

16. Apparatus as claimed in claim 10, wherein the waveguide structure of the fibre is designed such that loss at the said second wavelength $\lambda_{+1}$) is greater than at said first wavelength ($\lambda_0$).

17. Apparatus as claimed in claim 14, wherein said predetermined attenuation characteristic of the fibre has a local absorption maximum corresponding to naturally-occurring, or doped, impurities in the fibre, and said source means are selected such that said second wavelength ($\lambda_{+1}$) coincides with said local attenuation maximum or lies substantially on the short-wavelength edge of such an absorption maximum.

18. Apparatus as claimed in claim 17, wherein the said impurities are hydroxide ions.

19. Apparatus as claimed in claim 17, wherein the said impurities are rare earth metal ions.

20. Apparatus as claimed in claim 10, wherein the said optical fibre is provided with built-in gratings for reflecting optical radiation at said second wavelength ($\lambda_{+1}$).

21. Apparatus as claimed in claim 10, wherein at least a section of the fibre is bent so as to induce bending loss in the fibre at said second wavelength ($\lambda_{+1}$).

22. Apparatus as claimed in claim 10, wherein the said source means are operable to launch optical radiation at a third wavelength ($\lambda_{+2}$), equal to the wavelength on which a first order Stokes spectral band, which results from inelastic scattering in the fibre of optical radiation at the said second wavelength ($\lambda_{+1}$), is centred, into the fibre simultaneously with said optical radiation at said first wavelength ($\lambda_0$), thereby to cause optical radiation at said second wavelength ($\lambda_{+1}$) to be converted to optical radiation at said third wavelength ($\lambda_{+2}$) through stimulated scattering.

23. Apparatus as claimed in claim 22, wherein, to inhibit growth in the intensity in the fibre of optical radiation at a fourth wavelength ($\lambda_{+3}$), equal to the wavelength on which a first order Stokes spectral band, which results from inelastic scattering in the fibre of optical radiation at the said third wavelength ($\lambda_{+2}$), is centred, said source means are also operable to launch optical radiation at a fifth wavelength ($\lambda_{+4}$), equal to the wavelength on which a first order Stokes spectral band, which results from inelastic scattering in the fibre of optical radiation at the said fourth wavelength ($\lambda_{+3}$), is centred, into the fibre simultaneously with the optical radiation at the said third wavelength ($\lambda_{+2}$), thereby to cause optical radiation at said fourth wavelength ($\lambda_{+3}$) to be converted to optical radiation at said fifth wavelength ($\lambda_{+4}$) through stimulated scattering.

24. Optical time domain reflectometry apparatus for characterising an optical fibre, comprising source means operable to launch optical radiation at a preset first wavelength ($\lambda_0$) into the fibre, and detection means operable to detect optical radiation back-scattered along the fibre which is used to measure a selected characteristic of the fibre, wherein, so as to inhibit growth in the intensity in the fibre of optical radiation at a second wavelength ($\lambda_{+1}$), equal to the wavelength on which a first order Stokes spectral band, which results from inelastic scattering in the fibre of optical radiation at said preset first wavelength ($\lambda_0$), is centred, the source means are also operable to launch optical radiation at a third wavelength ($\lambda_{+2}$) into the fibre simultaneously with optical radiation at said preset first wavelength ($\lambda_0$), said third wavelength ($\lambda_{+2}$) being equal to the wavelength on which a first order Stokes spectral band, which results from inelastic scattering in the fibre of optical radiation at said second wavelength ($\lambda_{+1}$), is centred, thereby causing optical radiation at said second wavelength ($\lambda_{+1}$) to be converted to optical radiation at said third wavelength ($\lambda_{+2}$) and so suppressing conversion in the fibre of optical radiation at said preset first wavelength ($\lambda_0$) to optical radiation at said second wavelength ($\lambda_{+1}$) through stimulated scattering.

25. An optical time domain reflectometry method for sensing respective values of a physical parameter at different locations along an optical fibre, deployed through a region of interest, in which method optical radiation at a first preselected wavelength ($\lambda_0$) is launched into the fibre and back-scattered optical radiation in at least one preselected spectral band is used to produce output signals dependent upon the values being sensed, wherein none of the spectral bands used to produce said output signals lies about a second wavelength ($\lambda_{+1}$) which is equal to the wavelength on which a first order Stokes spectral band, which results from inelastic scattering in the fibre of optical radiation at said first preselected wavelength ($\lambda_0$), is centered, and said first preselected wavelength ($\lambda_0$) is selected so as to substantially minimise, for a preset length of said fibre, the value of a power loss variable for the fibre concerned, which variable is determined by subtracting from a first wavelength-dependent function, giving the total power loss along the preset length of fibre of forward- and backward-travelling optical radiation, a second wavelength-dependent function giving the maximum forward-travelling power which can be launched into said fibre such that power loss due to stimulated scattering in the fibre does not exceed a predetermined value, both functions being expressed in logarithmic units.

26. Optical time domain reflectometry apparatus for sensing respective values of a physical parameter at different locations through a region of interest, which apparatus comprises an optical fibre adapted to be deployed through said region of interest, source means for launching optical radiation at a first preselected wavelength ($\lambda_0$) into the fibre, detection means for receiving optical radiation back-scattered along the fibre from which respective values of the physical parameter can be derived, and filtering means for restricting the back-scattered radiation used to derive said values to one or more preselected spectral bands, wherein none of the spectral bands used to produce output signals lies about a second wavelength ($\lambda_{+1}$) which is equal to the wavelength on which a first order Stokes spectral band, which results from inelastic scattering in the fibre of optical radiation at said first preselected wavelength ($\lambda_0$), is centered, and said first preselected wavelength ($\lambda_0$) is such that, for a preset length of said fibre, the value of a power loss variable for the fibre concerned is substantially minimised, which variable is determined by subtracting from a first wavelength-dependent function, giving the total power loss along the said preset length of fibre of forward- and backward-travelling optical radiation, a second wavelength-dependent function giving the maximum forward-travelling power which can be launched into said fibre such that power loss due to stimulated scattering in the fibre does not exceed a predetermined value, both functions being expressed in logarithmic units.

27. An optical time domain reflectometry method of sensing respective values of a physical parameter at different locations along an optical fibre, deployed through a region of interest, in which method optical radiation at a first wavelength ($\lambda_0$) is launched into the fibre and back-scattered optical radiation in first and second spectral bands, centred respectively on said first wavelength ($\lambda_0$) and a second wavelength ($\lambda_1$) equal to the wavelength of an anti-Stokes spectral band which results from inelastic scattering in the fibre of optical radiation at said first wavelength ($\lambda_0$), is used to produce respective first and second sets of output signals, wherein, non-simultaneously with optical radiation at said first wavelength ($\lambda_0$), optical radiation substantially at said second wavelength ($\lambda_1$) is launched into the fibre and back-scattered optical radiation in a third spectral band, centred on said second wavelength ($\lambda_1$), is used to produce a third set of output signals, and a final set of output signals, dependent upon the values being sensed, is produced by normalising the first set of output signals to the geometric mean of the second and third sets of output signals.

28. Optical time domain reflectometry apparatus for sensing respective values of a physical parameter at different locations through a region of interest, which apparatus comprises an optical fibre adapted to be deployed through said region of interest, source means operable selectively to launch optical radiation at a first wavelength ($\lambda_0$) into the fibre, detection means for receiving optical radiation back-scattered along the fibre, and signal processing means for using such back-scattered optical radiation in first and second spectral bands, centred respectively on said first wavelength ($\lambda_0$) and a second wavelength ($\lambda_1$) equal to the wavelength of an anti-Stokes spectral band which results from an inelastic scattering in the fibre of optical radiation at said first wavelength ($\lambda_0$), to produce respective first and second sets of output signals, wherein said source means are also selectively operable to launch optical radiation substantially at said second wavelength ($\lambda_1'$) into the fibre, non-simultaneously with optical radiation at said first wavelength ($\lambda_0$), and said signal processing means are operable to use resulting back-scattered optical radiation in a third spectral band, centred on said second wavelength ($\lambda_1'$), to produce a third set of output signals, and are further operable to produce a final set of output signals, dependent upon the values being sensed, by normalising the second set of output signals to the geometric mean of the first and third sets of output signals.

* * * * *